United States Patent
Kuroda et al.

(10) Patent No.: US 7,623,299 B2
(45) Date of Patent: Nov. 24, 2009

(54) ZOOM LENS AND IMAGING APPARATUS

(75) Inventors: Daisuke Kuroda, Kanagawa (JP); Atsuo Minato, Kanagawa (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 10/541,094

(22) PCT Filed: Jan. 14, 2004

(86) PCT No.: PCT/JP2004/000198
§ 371 (c)(1),
(2), (4) Date: Jun. 29, 2005

(87) PCT Pub. No.: WO2004/066012
PCT Pub. Date: Aug. 5, 2004

(65) Prior Publication Data
US 2006/0152816 A1 Jul. 13, 2006

(30) Foreign Application Priority Data
Jan. 17, 2003 (JP) ............................. 2003-009718
Sep. 22, 2003 (JP) ............................. 2003-330038

(51) Int. Cl.
*G02B 15/14* (2006.01)
(52) U.S. Cl. ..................... 359/684; 359/676; 359/686; 359/687
(58) Field of Classification Search ......... 359/686–687, 359/684, 676
See application file for complete search history.

(56) References Cited
U.S. PATENT DOCUMENTS
4,256,381 A * 3/1981 Kreitzer ....................... 359/687
(Continued)

FOREIGN PATENT DOCUMENTS
JP 06-181530 6/1994
(Continued)

OTHER PUBLICATIONS
Japanese Office Action; Application No. 2003-330038; Dated: May 22, 2007.
(Continued)

*Primary Examiner*—Joseph Martinez
*Assistant Examiner*—James R Greece
(74) *Attorney, Agent, or Firm*—Rader, Fishman & Grauer PLLC

(57) ABSTRACT

A zoom lens is provided, which includes a first lens group Gr1 having positive refractive power, a second lens group Gr2 having negative refractive power, which is movable in an optical axis direction mainly for zooming (varying power), a third lens group Gr3 having positive refractive power, a fourth lens group Gr4 having negative refractive power, which is movable in the optical axis direction for correcting fluctuations in focal position during zooming and for focusing, and a fifth lens group Gr5 having positive refractive power, which lens groups are arrayed in order from an object side, wherein the first lens group includes a concave lens, a convex lens, and a triple-cemented lens T1 in which a lens L6 made of special low-dispersion glass is sandwiched in the middle, which lenses are arrayed in order from the object side. Thereby, a range from a super wide-angle area to a super telephoto area can be covered with angles of view of not less than 67 degrees at a wide-angle end and not more than 1.6 degrees at a telephoto end, various aberrations can be favorably corrected while providing a zoom ratio of about 40 times, and a zoom lens excellent in mass productivity can be attained.

28 Claims, 23 Drawing Sheets

U.S. PATENT DOCUMENTS

| | | | | |
|---|---|---|---|---|
| 4,345,822 A | * | 8/1982 | Tachihara | 359/686 |
| 5,267,082 A | * | 11/1993 | Ono et al. | 359/684 |
| 5,654,826 A | * | 8/1997 | Suzuki | 359/557 |
| 5,905,530 A | | 5/1999 | Yokota et al. | |
| 5,978,150 A | * | 11/1999 | Hamanishi et al. | 359/683 |
| 6,226,132 B1 | | 5/2001 | Abe | |
| 6,940,656 B2 | * | 9/2005 | Oomura et al. | 359/687 |

FOREIGN PATENT DOCUMENTS

| | | |
|---|---|---|
| JP | 08-005913 | 1/1996 |
| JP | 08-248317 | 9/1996 |
| JP | 2000-098221 | 4/2000 |
| JP | 2000-105336 | 4/2000 |
| JP | 2000-227548 | 8/2000 |
| JP | 2001-021803 | 1/2001 |
| JP | 2001-305426 | 10/2001 |

OTHER PUBLICATIONS

English Translation of International Preliminary Report mailed Sep. 2, 2005.

English Translation of Written Opnion of the International Searching Authority mailed Apr. 27, 2004.

International Search Report mailed Apr. 27, 2004.

* cited by examiner

ZOOM LENS AND IMAGING APPARATUS

TECHNICAL FIELD

The present invention relates to a novel zoom lens and a novel imaging apparatus. In particular, the present invention relates to an optimum zoom lens for a wide-angle, high-powered video camera covering from a super wind-angle area to a super telephoto area, and to an imaging apparatus using the zoom lens.

BACKGROUND ART

In the design of a zoom lens for video camera for people's livelihood, as trends of taking advantage of a downsized imaging element, there are a trend of aiming for downsizing with the same zoom ratio (variable power rate) and a trend of aiming for higher power in zoom ratio with a practical size.

As an example of techniques for realizing the higher-powered zoom lens in the latter trend, there is one described in Japanese Patent Application Publication No. 8-5913. This zoom lens is composed of five lens groups in an arrangement of positive, negative, positive, negative and positive refractive power in order from the object side, and at least a second lens group and a fourth lens group are moved for zooming (varying power) and focusing to thereby obtain a zoom ratio of about twenty times.

However, if by making use of further downsizing of the imaging element, the power rate is increasingly made high, for example, if in order to obtain a zoom ratio of 40 times, the technique of Japanese Patent Application Publication No. 8-5913 is applied as it is, the following problems have arisen. Namely, fluctuations in aberration by zooming, chromatic aberration and spherical aberration at a telephoto end, and the like cannot be corrected. Therefore, in the technique of Japanese Patent Application Publication No. 8-5913, while the practical size of a zoom lens is maintained, the realized power rate is limited to about 20 times.

Consequently, in a technique described in Japanese Patent Application Publication No. 2000-105336, in order to correct the fluctuations in aberration by zooming, the chromatic aberration and spherical aberration at the telephoto end, and the like, which have been problems in realizing the high power rate, aspherical lenses are introduced to a third lens group and a fifth lens group and a number of materials each having a large Abbe number and abnormal partial dispersibility are used to thereby realize an angle of view of not less than 85 degrees and a zoom ratio of 40 times at a wide-angle end.

However, in the technique shown in the above-described Japanese Patent Application Publication No. 2000-105336, three sheets of special low-dispersion glass each having a large Abbe number and abnormal partial dispersibility are used. Since this special low-dispersion glass has a soft quality and low latent flaw resistance as is well known, latent flaws are easily caused during ultrasonic cleaning in lens manufacturing. Furthermore, since a thermal expansion coefficient of the special low-dispersion glass is large, when it is heated inside a vacuum chamber in a vapor deposition process for lens coating, and immediately after the vapor deposition, air is caused to flow into the vacuum chamber to quench, cracks easily occur. Therefore, the glass needs to be left inside the vacuum chamber for long hours after the vapor deposition to cool slowly, so that a vapor deposition cycle takes long, which causes a problem with productivity and further disadvantageously affects costs.

Accordingly, the zoom lens shown in Japanese Patent Application Publication No. 2000-105336 wherein three lenses made of special low-dispersion glass are used cannot be mass-produced, and thus unsuitable for zoom lens for people's livelihood.

Consequently, in light of the above-described problems, it is an object of the present invention to provide a zoom lens which can cover from a super wide-angle area to a super telephoto area with angles of view of not less than 67 degrees at a wide-angle end and not more than 1.6 degrees at a telephoto end, whose various aberrations can be favorably corrected while having a zoom ratio of about 40 times, and which is excellent in mass productivity, and an imaging apparatus using the zoom lens.

DISCLOSURE OF THE INVENTION

In order to solve the above-described problems, a zoom lens of the present invention is an inner focus type having four or five lens groups, including at least a first lens group having positive refractive power, a second lens group having negative refractive power, which is movable in an optical axis direction mainly for zooming (varying power), a third lens group having positive refractive power, and a fourth lens group having positive or negative refractive power, which is movable in the optical axis direction for correcting fluctuations in focal position during zooming and for focusing, which lens groups are arrayed in order from the object side, wherein the first lens group has at least a concave lens, a convex lens, and a triple-cemented lens in which a lens made of special low-dispersion glass is sandwiched in the middle, which lenses are arrayed in order from the object side.

Furthermore, in order to solve the above-described problems, an imaging apparatus of the present invention includes a zoom lens, imaging means for transforming an image taken in by the zoom lens to an electrical image signal, and image control means, wherein the image control means, referring to a transformation coordinate coefficient prepared in advance according to a variable power rate by the zoom lens, moves points on the image which are defined by the image signal formed by the imaging means to form a new image signal subjected to coordinate transformation and to output the new image signal, and the zoom lens of an inner focus type having four or five lens groups, includes at least a first lens group having positive refractive power, a second lens group having negative refractive power, which is movable in an optical axis direction mainly for zooming (varying power), a third lens group having positive refractive power, and a fourth lens group having positive or negative refractive power, which is movable in the optical axis direction for correcting fluctuations in focal position during zooming and for focusing, which lens groups are arrayed in order from the object side, the first lens group having at least a concave lens, a convex lens, and a triple-cemented lens in which a lens made of special low-dispersion glass is sandwiched in the middle, which lenses are arrayed in order from the object side.

Accordingly, in the zoom lens and the imaging apparatus of the present invention, a range from a super wide-angle area to a super telephoto area can be covered with angles of view of not less than 67 degrees at a wide-angle end and not more than 1.6 degrees at a telephoto end, various aberrations can be favorably corrected while providing a zoom ratio of about 40 times, and the lens made of special low-dispersion glass is located in the middle of the triple-cemented lens, so that latent flaws are not caused during ultrasonic cleaning even if lens coating is not applied.

Furthermore, latent flaws caused at the time of lens polishing or during ultrasonic cleaning can be filled with an adhesive material between the cemented lens and the cementing makes coating unnecessary.

The invention described in claims 1, 9 and 21 is characterized in that the zoom lens is an inner focus type having four or five lens group, including at least a first lens group having positive refractive power, a second lens group having negative refractive power, which is movable in an optical axis direction mainly for zooming (varying power), a third lens group having positive refractive power, and a fourth lens group having positive or negative refractive power, which is movable in the optical axis direction for correcting fluctuations in focal position during zooming and for focusing, which lens groups are arrayed in order from the object side, wherein the first lens group has at least a concave lens, a convex lens, and a triple-cemented lens in which a lens made of special low-dispersion glass is sandwiched in the middle, which lenses are arrayed in order from the object side.

Accordingly, in the invention described in claims 1, 9 and 21, there can be obtained the zoom lens which can cover from the super wide-angle area to the super telephoto area with the angles of view of not less than 67 degrees at the wide-angle end and not more than 1.6 degrees at the telephoto end, and whose various aberrations can be favorably corrected while having a zoom ratio of about 40 times. Furthermore, since the lens made of special low-dispersion glass is located in the middle of the triple-cemented lens, latent flaws are not caused during ultrasonic cleaning even if lens coating is not applied, dents and latent flaws caused at the time of lens polishing and during ultrasonic cleaning can be filled with an adhesive agent located between the cemented lens, and the cementing makes the coating unnecessary, so that a zoom lens excellent in mass productivity can be attained at a low cost.

In the invention described in claims 2, 10 and 22, the triple-cemented lens in the first lens group includes a first concave lens A1, a convex lens A2 formed of special low-dispersion glass and a second concave lens A3, which lenses are arrayed in order from the object side, and the first concave lens A1 and the convex lens A2 are formed of materials satisfying two conditional formulae (1) n1−n2>0.3, and (2) |ν1−ν2|>40, wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), and νx is an Abbe number νd=(nd−1)/(nF−nC) at the line d of the lens Ax. Consequently, primary chromatic aberration, particularly primary chromatic aberration at the telephoto end can be favorably corrected, which contributes to the realization of the high power rate of 40 times.

In the invention described in claims 3, 4, 11, 12, 23 and 24, the triple-cemented lens in the first lens group includes a first concave lens A1, a convex lens A2 formed of special low-dispersion glass and a second concave lens A3, which lenses are arrayed in order from the object side, and the convex lens A2 and the second concave lens A3 are formed of materials satisfying three conditional formulae (3) |n2−n3|<0.1, (4) ν23>80, and (5) ΔP23>0.03, wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), and νx is an Abbe number νd=(nd−1)/(nF−nC) at the line d of the lens Ax, and Px is a partial dispersion ratio P=(ng−nF)/(nF−nC) of the lens Ax. Consequently, secondary chromatic aberration on the telephoto side, and spherical aberration, coma aberration, and axial chromatic aberration at the telephoto end can be favorably corrected.

In the invention described in claims 5 to 8, and claims 25 to 28, the first lens group includes a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side. Consequently, the correction of curved field, distortion aberration and spherical aberration is facilitated.

In the invention described in claims 13 to 16, the first lens group includes a first lens of a concave meniscus lens whose convex surface faces the object side, a second lens of a convex lens, a third lens of a concave meniscus lens whose convex surface faces the object side, a fourth lens L4 of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side. Consequently, the correction of curved field, distortion aberration and spherical aberration is facilitated.

In the invention described in claims 17 to 20, the first lens group includes a first lens of a concave meniscus lens whose convex surface faces the object side, a second lens of a convex lens, a cemented lens made of a third lens L3 of a concave meniscus lens whose convex surface faces the object side and a fourth lens of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side. Consequently, the correction of curved field, distortion aberration and the spherical aberration is facilitated.

BEST MODE FOR CARRYING OUT THE INVENTION

Hereinafter, respective embodiments of a zoom lens of the present invention are described with reference to accompanying drawings. FIGS. 1 to 4 show a first embodiment, FIGS. 5 to 8 show a second embodiment, FIGS. 9 to 12 show a third embodiment, FIGS. 13 to 16 show a fourth embodiment, and FIGS. 17 to 20 show a fifth embodiment, respectively.

In the description below, "si" denotes an i-th surface from the object side, "ri" denotes a curvature radius of the surface "si", "di denotes a surface interval on the optical axis between the i-th surface and an i+1-th surface from the object side, "ni" denotes a refractive index at a line d (wavelength 587.6 nm) of an i-th lens from the object side, "vi" denotes an Abbe number at the line d of the i-th lens from the object side, "f" denotes a focal length of an entire lens system, "Fno" denotes an open aperture F value, and "ω" denotes a half view angle, respectively.

Figure 1:
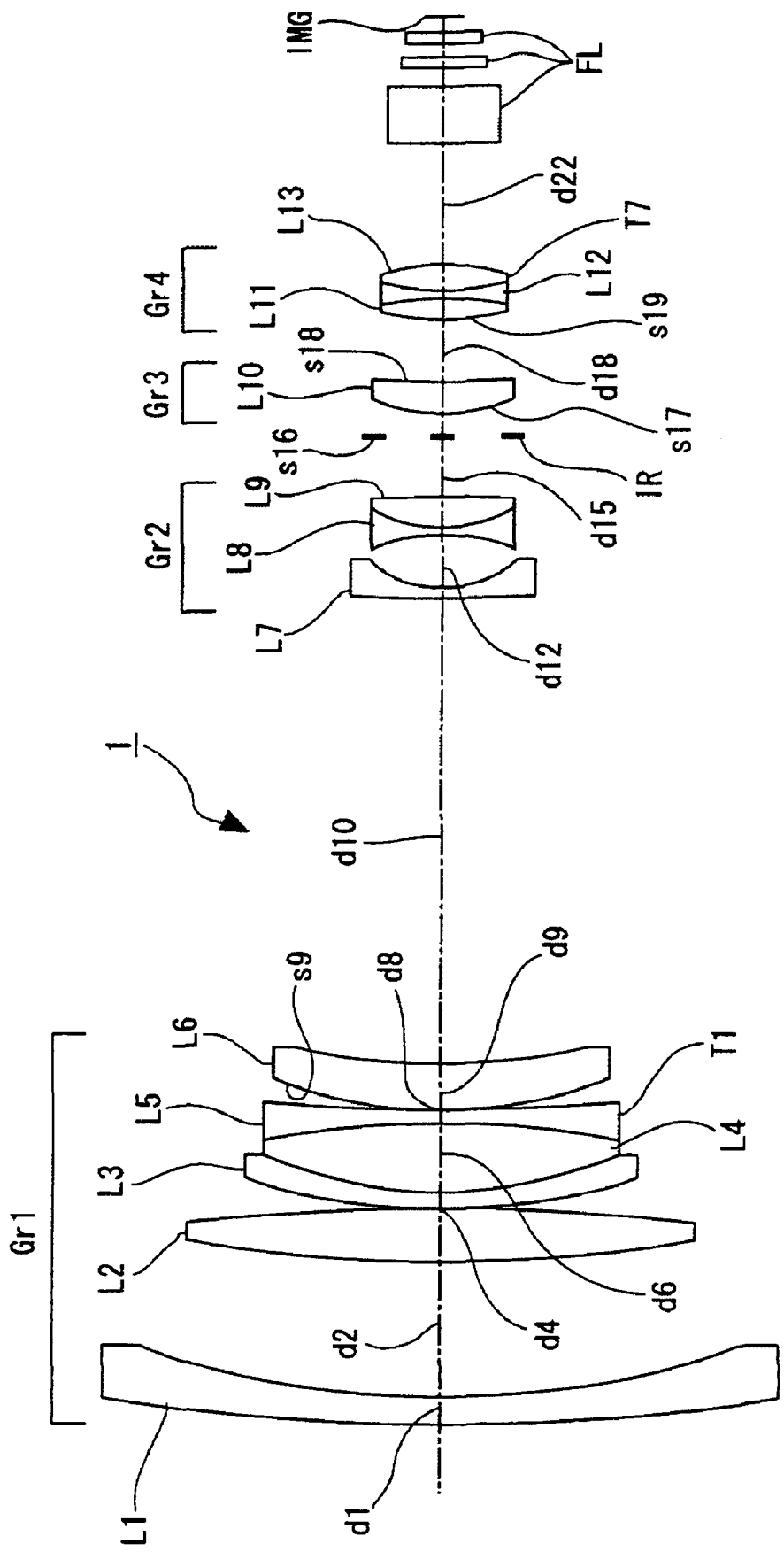
FIG. 1 shows a first embodiment of a zoom lens of the present invention together with FIGS. 2 to 4, and is a schematic view showing a lens configuration.
Figure 5:
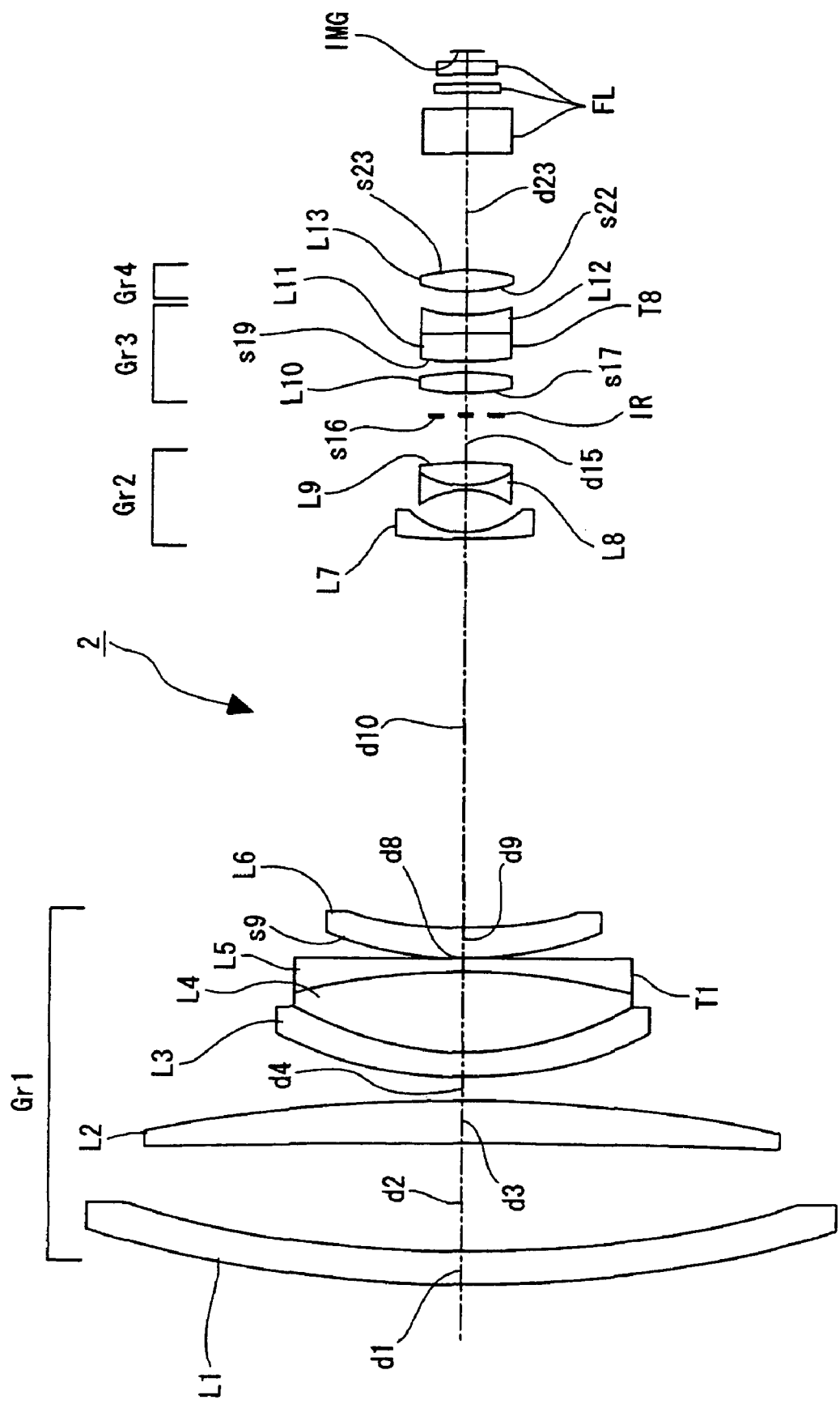
FIG. 5 shows a second embodiment of a zoom lens of the present invention together with FIGS. 6 to 8, and is a schematic view showing a lens configuration.

As shown in FIGS. 1 and 5, zoom lenses 1, 2 according to the first and second embodiments are inner focus type zoom lenses having a four-group configuration consisting of a first lens group Gr1 having positive refractive power, a second lens group Gr2 having negative refractive power, which is movable in an optical axis direction mainly for zooming (varying power), a third lens group Gr3 having positive refractive power, and a fourth lens group Gr4 having negative refractive force, which is movable in the optical axis direction for correcting fluctuations in focal position during zooming and for focusing, which lens groups are arrayed in order from the object side.

Figure 9:
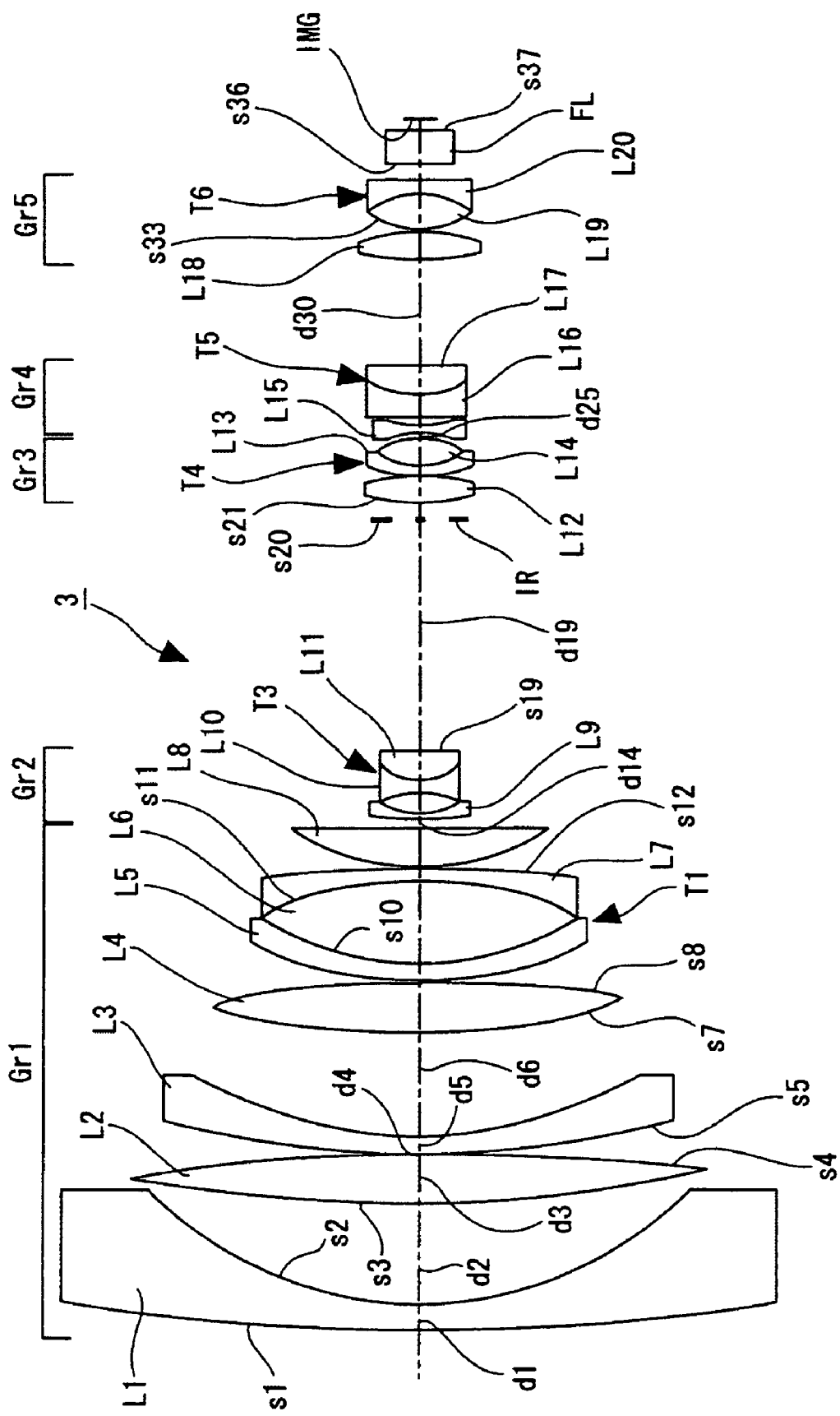
FIG. 9 shows a third embodiment of a zoom lens of the present invention together with FIGS. 10 to 12, and is a schematic view showing a lens configuration.
Figure 13:
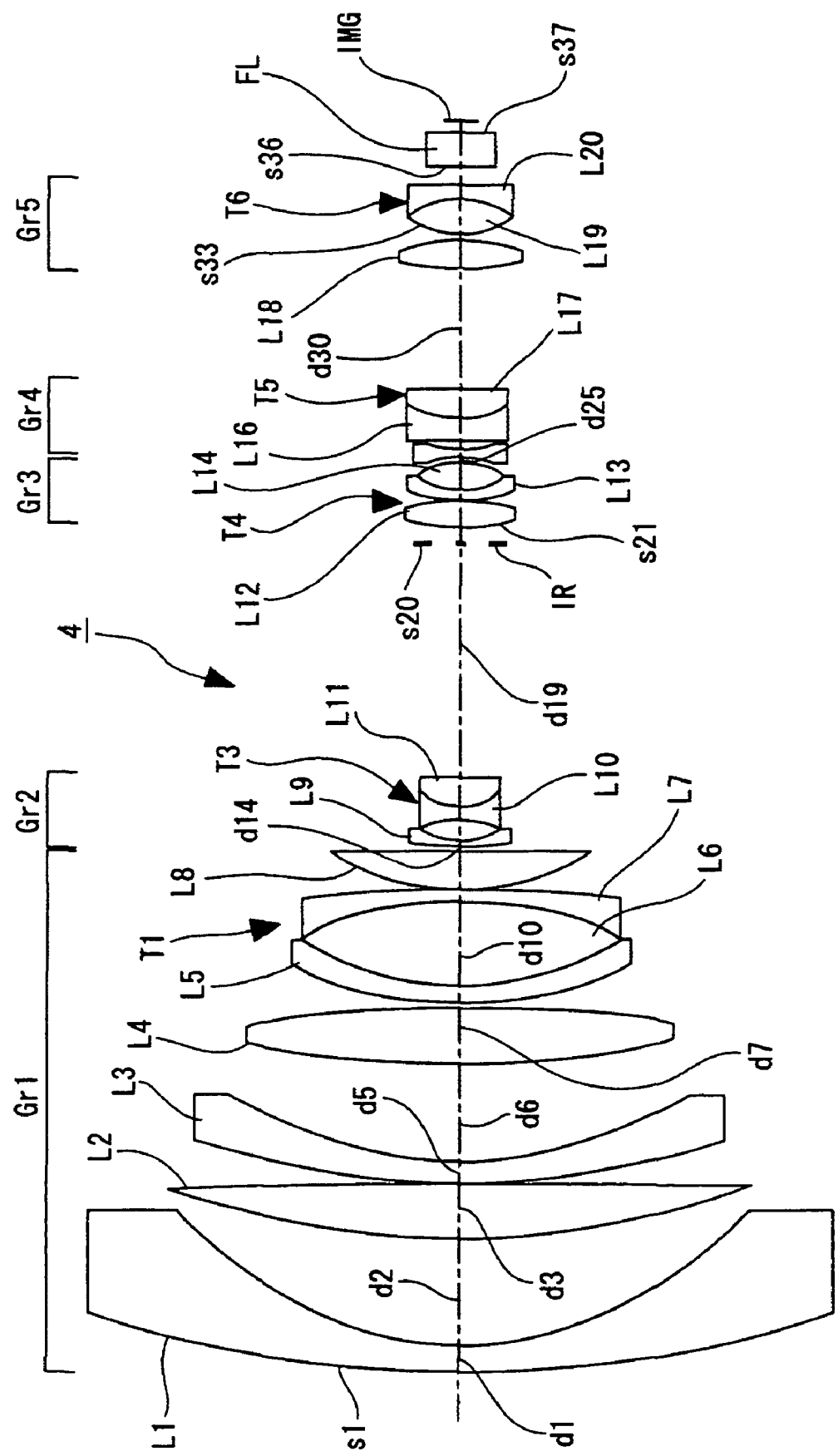
FIG. 13 shows a fourth embodiment of a zoom lens of the present invention together with FIGS. 14 to 16, and is a schematic view showing a lens configuration.
Figure 17:
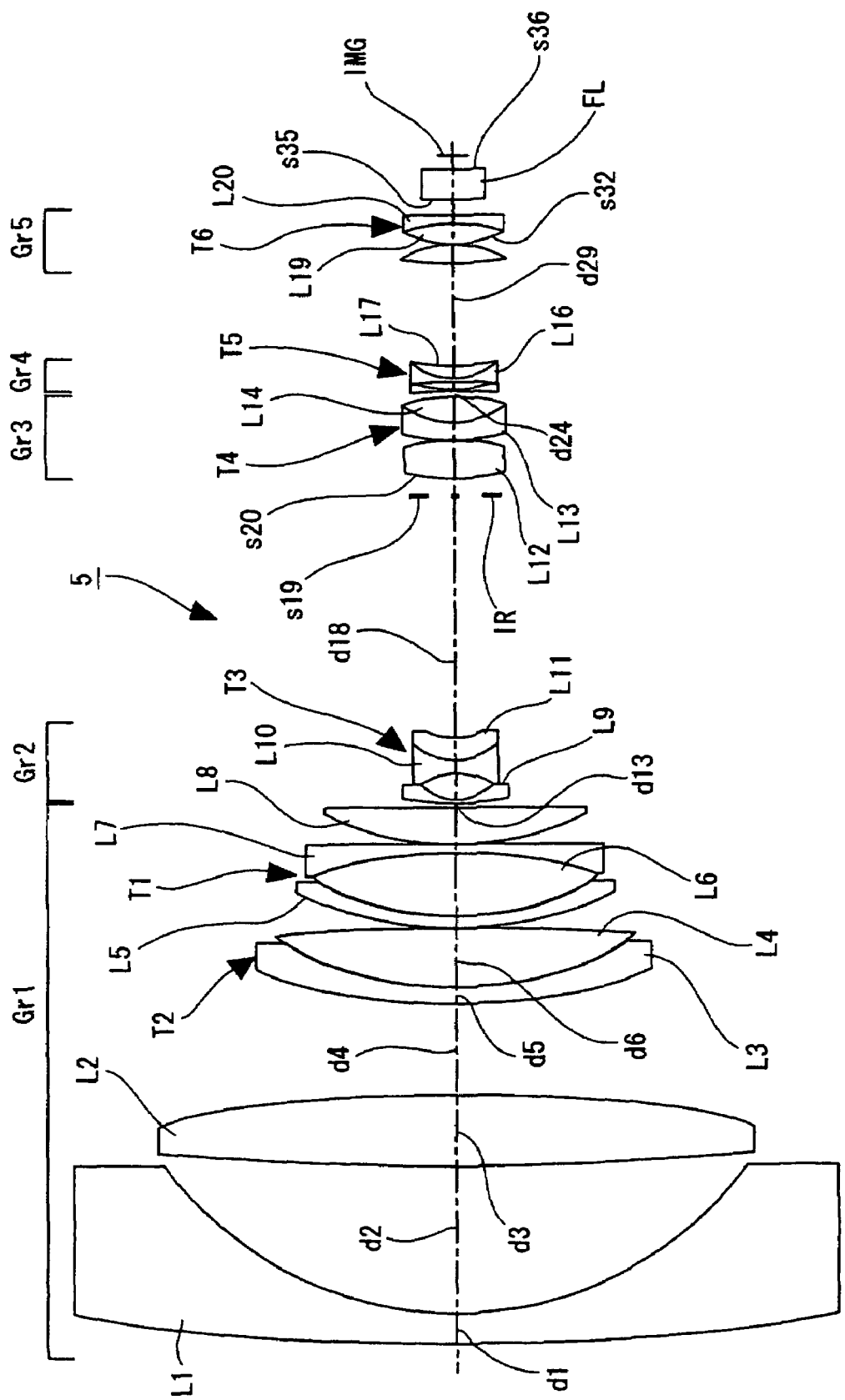
FIG. 17 shows a fifth embodiment of a zoom lens of the present invention together with FIGS. 18 to 20, and is a schematic view showing a lens configuration.

Furthermore, as shown in FIGS. 9, 13 and 17, zoom lenses 3, 4 according to the third, fourth and fifth embodiments are inner focus type zoom lenses having a five-group configuration consisting of a first lens group Gr1 having positive refractive power, a second lens group Gr2 having negative refractive power, which is movable in an optical axis direction mainly for zooming (varying power), a third lens group Gr3 having positive refractive power, a fourth lens group Gr4 having negative refractive force, which is movable in the optical axis direction for correcting fluctuations in focal position during zooming and for focusing, and a fifth lens group Gr5 having positive refractive power, which lens groups are arrayed in order from the object side.

The first lens group Gr1 has at least a concave lens, a convex lens, and a triple-cemented lens in which special low-dispersion glass is sandwiched in the middle, which lenses are arrayed in order from the object side.

A detailed description of the zoom lenses 1, 2 according to the first and second embodiments is first given.

In the zoom lenses 1 and 2 according to the first and second embodiments, the first lens group Gr1 is composed of four-group, six lenses consisting of a first lens L1 of a concave meniscus lens whose convex surface faces the object side, a second lens L2 of a convex lens, a triple-cemented lens T1 made of a third lens L3 of a concave meniscus lens whose convex surface faces the object side, a fourth lens L4 of a convex lens and a fifth lens L5 of a concave meniscus lens whose concave surface faces the object side, and a sixth lens L6 of a convex lens, which lenses are arrayed in order from the object side.

The second lens group Gr2 is composed of two-group, three lenses consisting of a seventh lens L7 of a concave lens, and a cemented lens T3 made of an eighth lens L8 of a concave lens and a ninth lens L9 of a convex lens, which lenses are arrayed in order form the object side.

The configuration of the lens groups of the third lens group Gr3 and later differs between the zoom lens 1 according to the first embodiment and the zoom lens 2 according to the second embodiment.

In the zoom lens 1 according to the first embodiment, the third lens group Gr3 is composed of a tenth lens L10 of a convex lens, and the fourth lens group Gr4 is composed of a triple-cemented lens T7 made of an eleventh lens L11 of a convex lens, a twelfth lens L12 of a concave lens and a thirteenth lens L13 of a convex lens.

In the zoom lens 2 according to the second embodiment, the third lens Gr3 is composed of two-group, three lenses consisting of a tenth lens L10 of a convex lens and a cemented lens T8 made of an eleventh lens L11 of a convex lens and a twelfth lens L12 of a concave lens, and the fourth lens group Gr4 is composed of a thirteenth lens L13, which lenses are arrayed in order from the object side.

In the zoom lenses 1, 2 according to the first and second embodiments, the first lens group Gr1 is characterized by having at least one concave lens and one convex lens. On the wide-angle side, by the concave lens (the first lens L1) and the convex lens (the second lens L2) arrayed in order from the object side, a wide angle of view can be achieved, and the correction of curved field can be facilitated. Furthermore, on the telephoto side, since the first lens group Gr1 has positive refractive power, spherical aberration on the lower side is easily caused. However, an action of the concave lens L2 arranged closer to the object facilitates the correction of this spherical aberration.

It is publicly known that using a material having a large Abbe number and abnormal partial dispersibility for a convex lens in a front group of a lens system is effective to the correction of chromatic aberration and secondary spectrum at a telephoto end.

However, in the zoom lenses 1 and 2, at the telephoto end, an incident light flux is designed to expand most by the triple-cemented lens T1. Accordingly, since the chromatic aberration at the telephoto end is subject to the configuration of the triple-cemented lens T1, materials of the triple-cemented lens T1 need to be suitable for the correction of the secondary spectrum in a general telephoto lens, that is, the triple-cemented lens T1 has a material composition satisfying the following conditional formulae.

$$n1-n2>0.3 \quad (1)$$

$$|v1-v2|>40 \quad (2)$$

$$|n2-n3|<0.1 \quad (3)$$

$$v23>80 \quad (4)$$

$$\Delta P23>0.03 \quad (5)$$

At this time, refractive indexes at a line C, a line d, a line F and a line g are nC, nd, nF and ng, respectively, nx: the refractive index nd at the line d of a lens Ax (an x-th lens from the object side among the triple-cemented lens, hereinafter, this is the same), vx: an Abbe number vd=(nd−1)/(nF−nC) at the line d of the lens Ax, and Px: a partial dispersion ratio P=(ng−nF)/(nF−nC) of the lens Ax.

Furthermore, if a convex lens A2 (the fourth lens L4) and a second concave lens A3 (the fifth lens L5) of the triple-cemented lens T1 are assumed to be a thin and closely-attached system, the convex lens A2 and the second concave lens A3 can be considered to be one virtual glass material A23.

Accordingly, with fx: a focal length of the lens Ax, a focal length of the glass material A23 is obtained by the following formula (6) and a dispersion value is obtained by the subsequent formula (7), $$1/f23=1/f2+1/f3 \quad (6)$$

$$1/f23 \cdot v23=1/f2 \cdot v2+1/f3 \cdot v3 \quad (7)$$

and by using the above-mentioned values, a partial dispersion ratio P23 is obtained by the following formula (8).

$$P23=(f2 \cdot v2 \cdot P3+f3 \cdot v3 \cdot P2)/(f2 \cdot v2+f3 \cdot v3) \quad (8)$$

Figure 22:
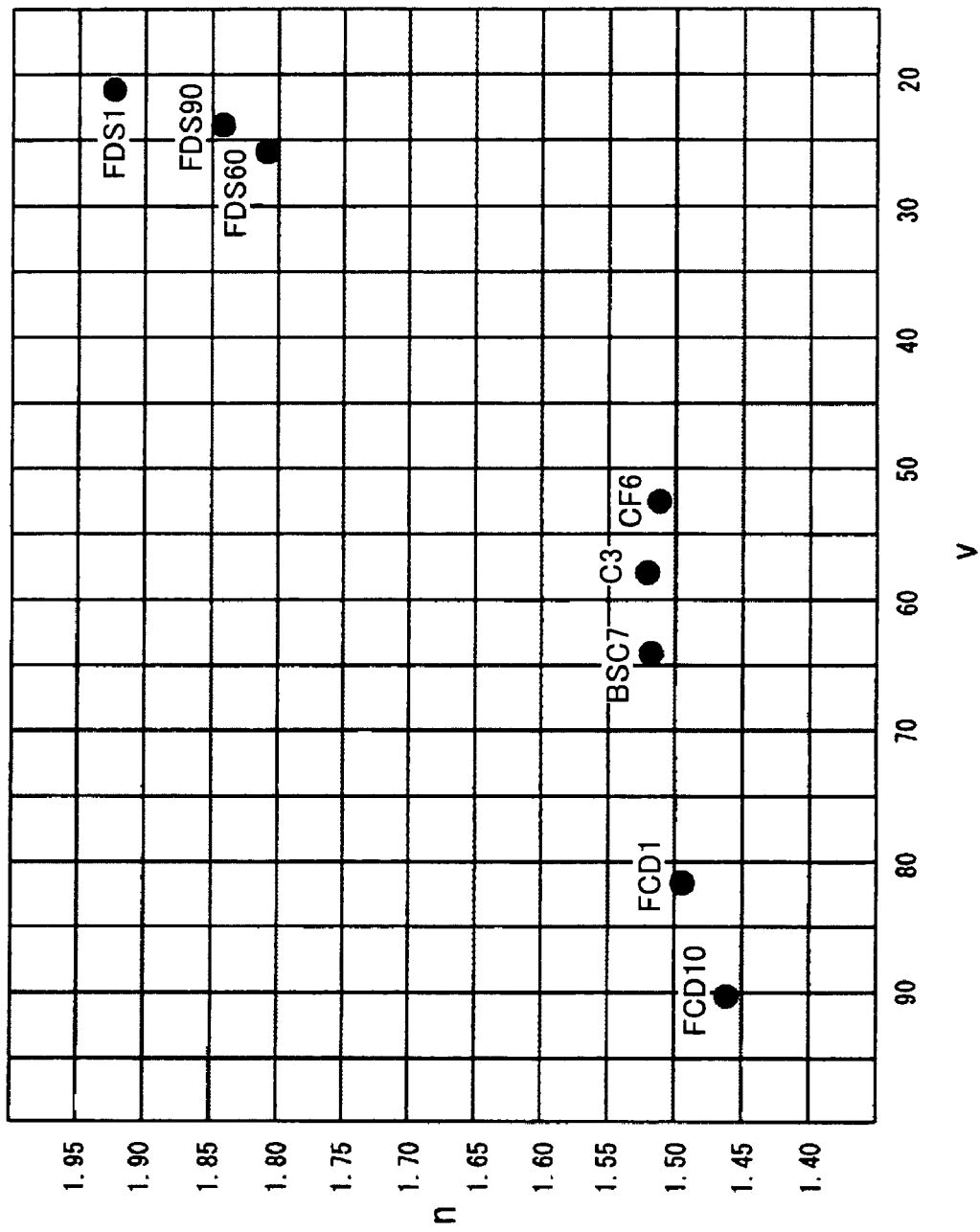
FIG. 22 is a chart in which several glass materials which are commercially available are distributed with refractive indexes thereof indicated in ordinate and with Abbe numbers thereof indicated in abscissa.
Figure 23:
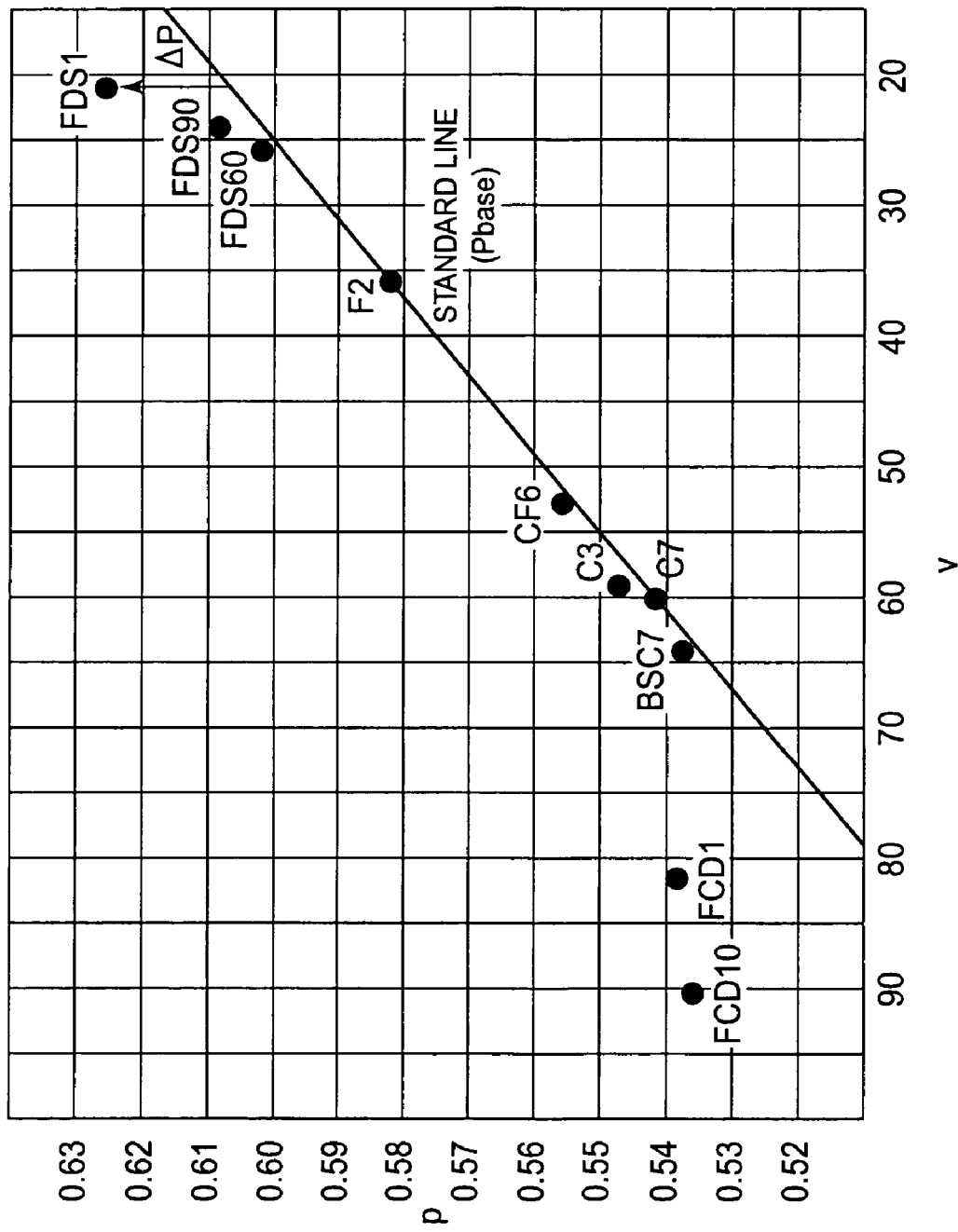
FIG. 23 is a chart in which the several glass materials which are commercially available are distributed with partial dispersion ratios thereof indicated in ordinate and with Abbe numbers thereof indicated in abscissa, and a standard line is indicated.

If in FIG. 22, with an Abbe number v indicated in abscissa and a refractive index n indicated in ordinate, and in FIG. 23, with the Abbe number v indicated in abscissa and a partial dispersion ratio P indicated in ordinate, part of glass materials produced by HOYA CORPORATION are shown, and if a standard line passing glass materials C7 and F2 is Pbase in FIG. 23, Pbase=−0.00174906×v23+0.64662907 and at this time,

ΔP23=P23−Pbase

Then, glass materials of the convex lens A2 (the fourth lens L4) and the second concave lens A3 (the fifth lens L5) are arbitrarily selected from the glass materials shown in FIG. 23, and when the inclination of a line connecting these two glass materials is gentler than that of the standard line Pbase, secondary spectrum is reduced as compared with a case where achromatism is performed on the standard line Pbase.

The conditional formulae (1) and (2) express primary achromatism conditions, and requisites for correcting primary chromatic aberration on the telephoto side. If the conditional formulae (1) and (2) are not satisfied, the chromatic aberration at the telephoto end becomes remarkable, so that the high variable power rate of 40 times cannot be realized.

In the zoom lenses 1 and 2, it is assumed that the special low-dispersion glass, for example, FCD1 or FCD10 is used for the lens A2 (the fourth lens L4) in the middle of the triple-cemented lens T1, and in order to satisfy the conditional formulae (1), (2), for a first concave lens A1 (the third lens L3), glass materials other than flint type FDS60, FDS90, TaFD30 and FDS1, for example, are excluded.

The conditional formulae (3), (4), (5) are secondary achromatism conditions and requisites for correcting secondary chromatic aberration on the telephoto side. When the conditional formula (3) is not satisfied, it is difficult to correct spherical aberration, coma aberration, and axial chromatic aberration on the telephoto side. When the conditional formulae (4) and (5) are satisfied, the inclination of the line connecting the glass materials of the convex lens A2 (the fourth lens L4) and the second concave lens A3 (the fifth lens L5) becomes gentler than the inclination of the standard line Pbase shown in FIG. 23, contributing to a reduction in the secondary spectrum. For this, by selecting the glass materials of the convex lens A2 (L4) made of special low-dispersion glass and the second concave lens A3 (L5) so as to satisfy the conditional formula (3) and |P2−P3|<0.03, a desired composition can be obtained.

In the zoom lenses 1 and 2, it is assumed that FCD1 or FCD10 which is special low-dispersion glass is used for the lens A2 (L4) in the middle of the triple-cemented lens T1, and in order to satisfy the conditional formulae (4) and (5), it is necessary to select the glass materials so as to satisfy the conditional formula (3) and |P2−P3|<0.03. For this, it is necessary to use a glass material which is of crown type and is located above the standard line Pbase in FIG. 23 for the second concave lens A3 (L5). When the conditional formulae (4) and (5) are not satisfied, the inclination of the line connecting the glass material of the convex lens A2 (L4) and the glass material of the second concave lens A3 (L5) is the same as the inclination of the standard line Pbase shown in FIG. 23, which makes it difficult to correct the secondary spectrum.

From the foregoing, the following combinations of the glass materials of the respective lenses for composing the triplet-cemented lens T1 obtained by attaching the three lenses can be considered. Namely, it can be considered that for the first concave lens A1 (L3), flint type FDS90 or FDS1 is used, for the convex lens A2 (L4), FCD1 or FCD10 of special low-dispersion glass is used, and for the second concave lens A3 (L5), BSC7, C3, CF6 or the like which is of crown type and is located above the standard line Pbase in FIG. 23 is used.

Here, it should be noted that the special low-dispersion glass is used for the convex lens A2 (L4) of the triple-cemented lens T1. Since the special low-dispersion glass has a soft quality and low latent flaw resistance, latent flaws are easily caused during ultrasonic cleaning performed in lens manufacturing. However, by sandwiching the special low-dispersion glass between the lenses A1 (L3), A3 (L5) made of general glass from both surfaces thereof, even if some hiatus is caused, it can be filled with an adhesive agent. Furthermore, the special low-dispersion glass has a problem in that due to a large thermal expansion coefficient, when the lens is heated in vacuum in a vapor deposition process for lens coating and air is caused to flow in immediately after the vapor deposition, the glass is rapidly cooled by the air, so that cracks easily occur. However, by adhesive-bonding the lenses made of general glass onto both surfaces of the special low-dispersion glass, coating itself becomes unnecessary. For these reasons, the special low-dispersion glass, which has been unsuitable for mass production, can be made excellent in mass productivity by using it in the middle of the triple-cemented lens T1.

The third lens group Gr3 which is a fixed group is a part in which a light flux expands most at the wide-angle end, and thus, a part having dominant influence on spherical aberration and coma aberration at the wide-angle end. Accordingly, in the zoom lenses 1 and 2, at least one of respective surfaces composing the third lens group Gr3 is formed of an aspherical surface, and at the same time, at least one of the surfaces each formed of the aspherical surface is formed into an aspherical surface shape which is shallower in effective diameter than a depth of a paraxial spherical surface. Furthermore, in the zoom lens 2, it is effective that the positive refractive power of the third lens group Gr3 is divided and shared in the two lens groups and further in one of the groups, cemented surfaces having negative refractive power are provided. Therefore, in the zoom lens 2, the third lens group Gr3 is composed of the convex lens (the tenth lens L10), and the cemented lens T8 of the convex lens (the eleventh lens L11) and the concave lens (the twelfth lens L12), thereby suppressing the generation of spherical aberration and the generation of coma aberration.

With respect to the correction of astigmatism and distortion aberration at the wide-angle end, in the zoom lenses 1 and 2, at least one of respective surfaces composing the fourth lens group Gr4 is formed of an aspherical surface and at the same time, at least one of the surfaces each formed of the aspherical surface is formed into an aspherical surface shape which is shallower in effective diameter than a depth of a paraxial spherical surface.

Subsequently, the zoom lenses 3, 4, 5 according to the third, fourth and fifth embodiments are described in detail.

In the zoom lenses 3 and 4 according to the third embodiment and the fourth embodiment, the first lens group Gr1 is composed of six-group, eight lenses consisting of a first lens L1 of a concave meniscus lens whose convex surface faces the object side, a second lens L2 of a convex lens, a third lens L3 of a concave meniscus lens whose convex surface faces the object side, a fourth lens L4 of a convex lens, a triple-cemented lens T1 made of a fifth lens L5 of a concave meniscus lens whose convex surface faces the object side, a sixth lens L6 of a convex lens and a seventh lens L7 of a concave meniscus lens whose concave surface faces the object side, and an eighth lens L8 of a convex lens, which lenses are arrayed in order from the object side.

In the zoom lens 5 according to the fifth embodiment, the first lens group Gr1 is composed of five-group, eight lenses consisting of a first lens L1 of a concave meniscus lens whose convex surface faces the object side, a second lens L2 of a convex lens, a cemented lens T2 made of a third lens L3 of a concave meniscus lens whose convex surface faces the object side and a fourth lens L4 of a convex lens, a triple-cemented lens T1 made of a fifth lens L5 of a concave meniscus lens whose convex surface faces the object side, a sixth lens L6 of a convex lens and a seventh lens L7 of a concave meniscus lens whose concave surface faces the object side, and an eighth lens L8 of a convex lens, which lenses are arrayed in order from the object side.

In the zoom lenses 4, 5 and 6, the second lens group Gr2 is composed of three lenses consisting of a ninth lens L9 of a concave lens, and a cemented lens T3 made of a tenth lens L10 of a concave lens and an eleventh lens 11 of a convex lens, which lenses are arrayed in order from the object side.

The third lens group is composed of three lenses consisting of a twelfth lens L12 of a convex lens and a cemented lens T4 made of a thirteenth lens of a concave lens and a fourteenth lens L14 of a convex lens, which lenses are arrayed in order from the object side.

The fourth lens group Gr4 is composed of three lenses consisting of a fifteenth lens L15 of a concave lens and a cemented lens T5 made of a sixteenth lens L16 of a concave lens and a seventeenth lens L17 of a convex lens, which lenses are arrayed in order from the object side.

The fifth lens group Gr5 is composed of three lenses consisting of an eighteenth lens L18 of a convex lens and a cemented lens T6 made of a nineteenth lens L19 of a convex lens and a twentieth lens L20 of a concave lens, which lenses are arrayed in order from the object side.

In addition, the first lens group Gr1 can be divided into a front group consisting of the first lens L1 to the third lens L3 which has negative refractive power and a rear group consisting of the fourth lens L4 to the eighth lens L8 which has positive refractive power.

The front group of the first lens group Gr1 is characterized by having at least one concave lens and one convex lens. By using the concave lens (the first lens L1) and the convex lens (the second lens L2) which lenses are arrayed in order from the object side, at the wide-angle end, the concave lens makes the inclination of a principal ray gentle, thereby facilitating the correction of curved field, and the action of the convex lens L2 facilitates the correction of distortion aberration. Furthermore, at the telephoto side, although spherical aberration on the lower side is easily caused because the first lens group Gr1 has positive refractive power, the action of the concave lens arranged closer to the object side facilitates the correction of this spherical aberration. Moreover, although the front group of the first lens group Gr1 has strong negative refractive power, in order to suppress the generation of distortion aberration on the barrel side is suppressed as much as possible, the first lens L1 and the third lens L3 are each made of a concave meniscus lens whose convex surface face the object side, and further since the distortion aberration at the wide-angle end needs to be corrected by positive refractive power, this is corrected by the second lens L2 which is a convex lens.

It is publicly known that using a material having a large Abbe number and abnormal partial dispersibility for the convex lens of the front group in the lens system is effective to the correction of chromatic aberration and the correction of secondary spectrum at the telephoto side.

However, the zoom lenses 3, 4 and 5, an incident light flux is designed to expand most in the triple-cemented lens T1 at the telephoto end. Accordingly, since the chromatic aberration at the telephoto end is subject to the configuration of the triple-cemented lens T1, the materials of the triple-cemented lens T1 need to be suitable for the correction of the secondary spectrum in a general telephoto lens, that is, the triple-cemented lens T1 need to have a material composition satisfying the above-described conditional formulae (1), (2), (3), (4) and (5).

Furthermore, if a convex lens A2 (the sixth lens L6) and a second concave lens A3 (the seventh lens L7) of the triple-cemented lens T1 are assumed to be a thin and closely-attached system, the convex lens A2 and the second concave lens A3 can be considered to be one virtual glass material A23.

Accordingly, a focal length of the virtual glass material A23 is obtained by the formula (6), and a dispersion value is obtained by the formula (7), and by using the values, a partial dispersion ratio P23 is obtained by the formula (8).

Figure 14:
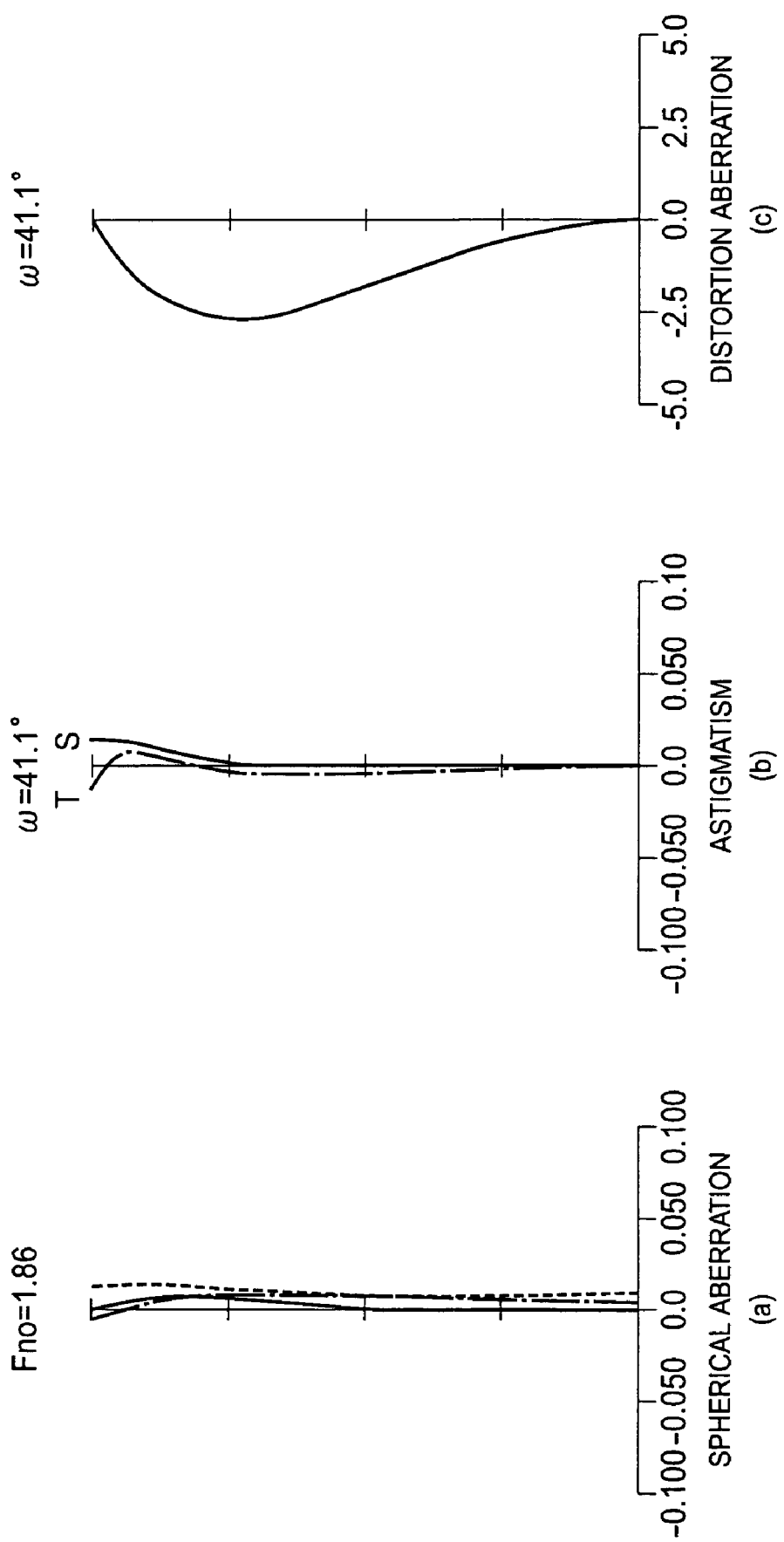
FIG. 14 is charts showing spherical aberration, astigmatism and distortion aberration at a wide-angle end.

As described above, if in FIG. 22, with an Abbe number v indicated in abscissa and a refractive index n indicated in ordinate, and in FIG. 23, with an Abbe number v indicated in abscissa and a partial dispersion ratio P indicated in ordinate, part of glass materials produced by HOYA CORPORATION are shown, and if the standard line passing the glass materials C7 and F2 is Pbase in FIG. 14, $$Pbase=-0.00174906 \times v23+0.64662907$$

and at this time, $$\Delta P23 = P23 - Pbase$$

Then, the glass materials of the convex lens A2 (the sixth lens L6) and the second concave lens A3 (the seventh lens L7) are arbitrarily selected from the glass materials shown in FIG. 23, and when the inclination of a line connecting these two glass materials is gentler than that of the standard line Pbase, secondary spectrum is reduced as compared with a case where achromatism is performed on the standard line Pbase.

The conditional formulae (1) and (2), as described above, express primary achromatism conditions, and requisites for correcting primary chromatic aberration on the telephoto side. If the conditional formulae (1) and (2) are not satisfied, the chromatic aberration at the telephoto end becomes remarkable, so that the high variable power rate of 40 times cannot be realized.

In the zoom lenses 3, 4 and 5, it is assumed that the special low-dispersion glass, for example, FCD1 or FCD10 is used for the lens A2 (the sixth lens L6) in the middle of the triple-cemented lens T1, and in order to satisfy the conditional formulae (1), (2), for a first concave lens A1 (the fifth lens L5), glass materials other than flint type FDS60, FDS90, TaFD30 and FDS1, for example, are excluded.

The conditional formulae (3), (4), (5), as described above, express secondary achromatism conditions and requisites for correcting secondary chromatic aberration on the telephoto side. When the conditional formula (3) is not satisfied, it is difficult to correct the spherical aberration, coma aberration, and axial chromatic aberration on the telephoto side. When the conditional formulae (4) and (5) are satisfied, the inclination of the line connecting the glass materials of the convex lens A2 (the sixth lens L6) and the second concave lens A3 (the seventh lens L7) becomes gentler than the inclination of the standard line Pbase shown in FIG. 23, contributing to a reduction in secondary spectrum. For this, by selecting the glass materials of the convex lens A2 (L6) made of special low-dispersion glass and the second concave lens A3 (L7) so as to satisfy the conditional formula (3) and |P2−P3|<0.03, the desired composition can be obtained. In the zoom lenses 3, 4 and 5, it is assumed that FCD1 or FCD10 which is special low-dispersion glass is used for the lens A2 (L6) in the middle of the triple-cemented lens T1, and in order to satisfy the conditional formulae (4) and (5), it is necessary to select the glass materials so as to satisfy the conditional formula (3) and |P2−P3|<0.03. For this, it is necessary to use a glass material which is of crown type and is located above the standard line Pbase in FIG. 23 for the second concave lens A3 (L7). When the conditional formulae (4) and (5) are not satisfied, the inclination of the line connecting the glass material of the convex lens A2 (L6) and the glass material of the second concave lens A3 (L7) is the same as the inclination of the standard line Pbase shown in FIG. 23, which makes it difficult to correct the secondary spectrum.

From the foregoing, the following combinations of the glass materials of the respective lenses for composing the triplet-cemented lens T1 obtained by attaching the three lenses can be considered. Namely, it can be considered that for the first concave lens A1 (L5), flint type FDS90 or FDS1 is used, for the convex lens A2 (L6), FCD1 or FCD10 of special low-dispersion glass is used, and for the second concave lens A3 (L7), BSC7, C3, CF6 or the like which is of crown type and is located above the standard line Pbase in FIG. 23.

Here, it should be noted that the special low-dispersion glass is used for the convex lens A2 (L6) of the triple-cemented lens T1. Since the special low-dispersion glass has a soft quality and low latent flaw resistance, latent flaws are easily caused during ultrasonic cleaning performed in lens manufacturing. However, by sandwiching the special low-dispersion glass between the lenses A1 (L5), A3 (L7) made of general glass from both surfaces thereof, even if some hiatus is caused, it can be filled with an adhesive agent. Furthermore, the special low-dispersion glass has a problem in that due to a large thermal expansion coefficient, when the lens is heated in vacuum in a vapor deposition process for lens coating and air is caused to flow in immediately after the vapor deposition, the glass is rapidly cooled by the air, so that cracks easily occur. However, by adhesive-bonding the lenses made of general glass on both surfaces of the special low-dispersion glass, coating itself becomes unnecessary. For these reasons, the special low-dispersion glass, which has been unsuitable for mass production, can be made excellent in mass productivity by using it in the middle of the triple-cemented lens T1.

With respect to the correction of spherical aberration and coma aberration at the wide-angle end, in the zoom lenses 3, 4 and 5, at least one of respective surfaces of the twelfth lens L12 to the fourteenth lens L14 composing the third lens group Gr3 is formed of an aspherical surface and at the same time, at least one of the surfaces each formed of the aspherical surface is formed into an aspherical surface shape which is shallower in effective diameter than a depth of a paraxial spherical surface.

The third lens group Gr3 which functions to change a diverged light flux coming out of the second lens group Gr2 to a converged light flux and send it to the fourth lens group Gr4 has strong positive refractive power and is a part in which the light flux expands most at the wide-angle end, and thus, a part having dominant influence on the spherical aberration and the coma aberration at the wide-angle end. Accordingly, in order to change the diverged light flux to the converged light flux moderately, it is effective that the positive refractive power of the third lens group Gr3 is divided and shared in the two lens groups and further in one of the groups, cemented surfaces having negative refractive power are provided. Therefore, in the zoom lens 3, 4 and 5, the third lens group Gr3 is composed of the convex lens (the twelfth lens L12), and the cemented lens T4 made of the concave lens (the thirteenth lens L13) and the convex lens (the fourteen lens L14), thereby suppressing the generation of spherical aberration and the generation of coma aberration.

Further, in order to make assurance double sure, as described above, at least one of respective surfaces s21 to s25 of the twelfth lens L12 to the fourteenth lens L14 is formed into an aspherical surface and at the same time, at least one of the surfaces each formed into the aspherical surface is formed into an aspherical surface shape which is shallower in effective diameter than a depth of a paraxial spherical surface.

With respect to the correction of astigmatism and distortion aberration at the wide-angle end, in the zoom lenses 3, 4 and 5, at least one of respective surfaces of the eighteenth lens L18 to the twentieth lens L20 composing the fifth lens group Gr5 is formed of an aspherical surface and at the same time, at least one of the surfaces each formed of the aspherical surface is formed into an aspherical surface shape which is shallower in effective diameter than a depth of a paraxial spherical surface.

A ray height of a principal ray raised outside in the fourth lens group Gr4 becomes higher than a maximum image height in the fifth lens group Gr5, and thus, the principal ray needs to be bent so that an exit pupil is located behind an image surface. Accordingly, in order to bend the principal ray moderately, in the fifth lens group Gr5, the positive refractive power is divided and shared in the two lens groups and in one of the lens groups, the cemented surfaces having the negative refractive power are provided. Consequently, the fifth lens group Gr5 is composed of the convex lens (the eighteenth lens L18) and the cemented lens T6 made of the convex lens (the nineteenth lens L19) and the concave lens (the twentieth lens L20) to thereby suppress the generation of astigmatism and distortion aberration.

Furthermore, in order to make assurance double sure, as described above, at least one of respective surfaces s32 to s35 of the eighteenth lens L18 to the twentieth lens L20 is formed into an aspherical surface and at the same time, at least one of the surfaces each formed into the aspherical surface is formed into an aspherical surface shape which is shallower in effective diameter than a depth of a paraxial spherical surface.

Figure 21:
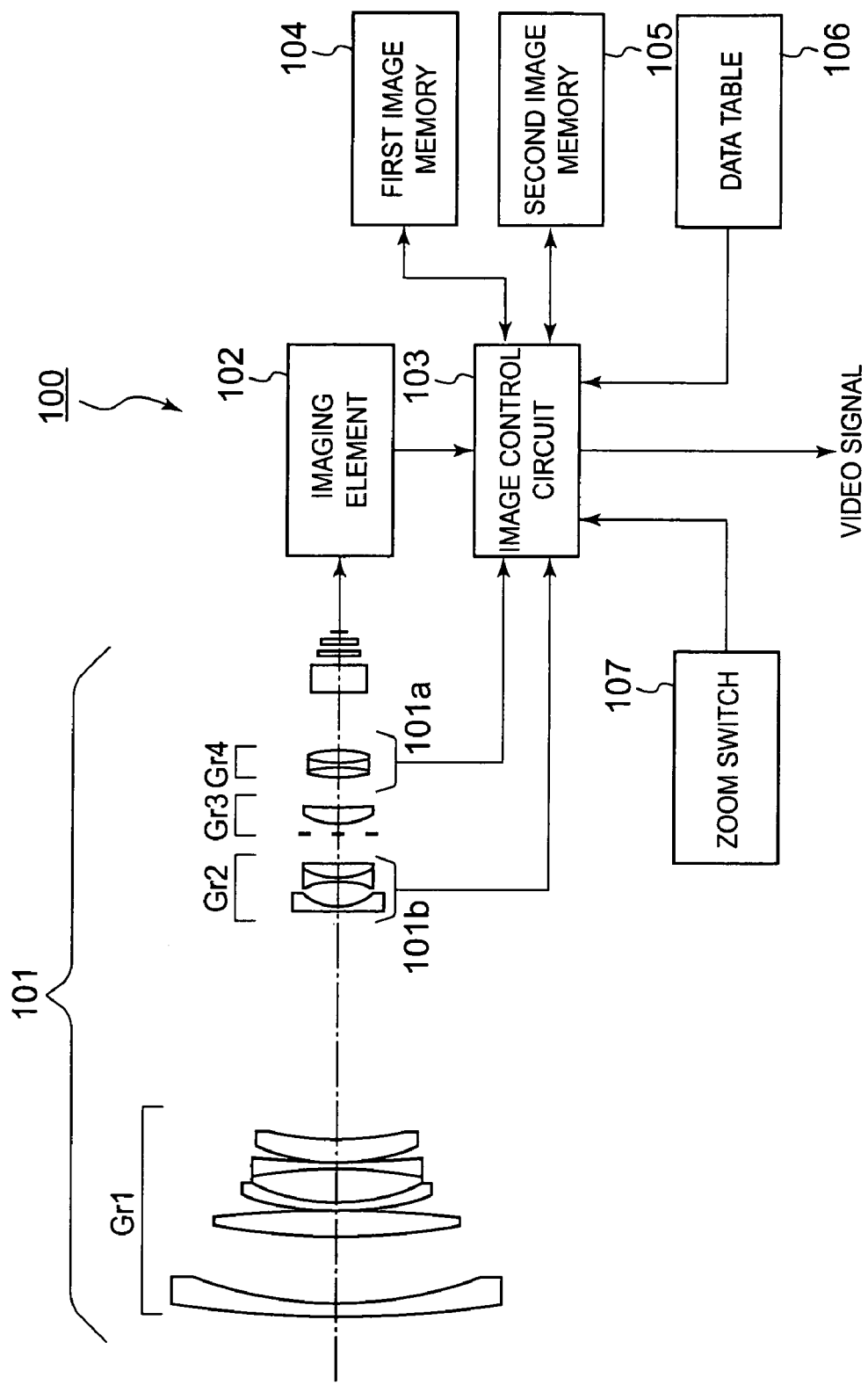
FIG. 21 is a block diagram of substantial parts showing an embodiment of an imaging apparatus of the present invention.

FIG. 21 is a block diagram showing a configuration example of an imaging apparatus 100 according to the present invention. In FIG. 21, reference numeral 101 denotes a photographing lens capable of zooming which is provided with a focus lens 101a and variator lens 101b, reference numeral 102 denotes an imaging element (imaging means) such as CCD, reference numeral 103 denotes image control circuit (image control means) controlling various operations such as correction of an image, reference numeral 104 denotes a first image memory storing image data obtained from the imaging element 102, and reference numeral 105 denotes a second image memory storing image data with distortion corrected. Reference numeral 106 denotes a data table storing distortion aberration information of the photographing lens 101, and reference numeral 107 denotes a zoom switch transforming a direction of zooming by a photographer into an electrical signal.

For example, the zoom lens 1, 2, 3, 4 or 5 according to each of the above-mentioned embodiments can be applied to the photographing lens 101, and in this case, the focus lens 101a corresponds to the fourth lens group Gr4, and the variator lens 101b corresponds to the second lens group Gr2.

With respect to distortion aberration of the zoom lens 101, a distortion aberration curved line varies in accordance with zooming as shown in FIGS. 2 to 4, FIGS. 6 to 8, FIGS. 10 to 12, FIGS. 14 to 16 and FIGS. 18 to 20. Accordingly, the variation in distortion aberration depends on a position of the variator lens 101b. In the data table 106, there are stored transformation coordinate coefficients associating two-dimensional position information of the first image memory 104 and the second image memory 105 at a position where the variator lens 101b is located. Furthermore, the position of the variator lens 101b is demarcated into many positions from the wide-angle end to the telephoto end and the transformation coordinate coefficients corresponding to the respective positions are stored in the data table 106.

When the photographer operates the zoom switch 107 to move the variator lens 101b, the image control circuit 103 controls to move the focus lens 101a for preventing defocusing and receives a transformation coordinate coefficient corresponding to the position of the variator lens 101b from the data table 106. When the position of the variator lens 101b does not coincide with any position demarcated in advance, an appropriate transformation coordinate coefficient is obtained by processing such as interpolation from a transformation coordinate coefficient at a near position. While the transformation coordinate coefficient is a coefficient for moving positions of points on an image which are arranged discretely, for an image between the points arranged discretely, the destination of the movement is obtained by the processing such as interpolation. The image control circuit 103 performs vertical and horizontal image moving processing for the information of the first image memory 104 obtained from the imaging element 102, based on this transformation coordinate coefficient to thereby correct distortion, creates image information with the distortion corrected in the second image memory 105, and outputs a signal based on the image information created in the second image memory 105, as a video signal.

Subsequently, a description of numeric value examples of the zoom lenses 1, 2, 3, 4 and 5 according to the respective embodiments is given. In FIGS. 1, 5, 9, 13 and 17, reference character IR denotes an iris fixed immediately before the third lens group Gr3 and reference character FL denotes a filter interposed before an image surface IMG.

The lenses used in the respective embodiments include lenses whose lens surfaces are each formed of an aspherical surface. If a depth of the aspherical surface is "x" and a height from the optical axis is "H", the aspherical surface shape is defined by the following formula.

$$x = H^2/ri \cdot \{1+(1-H^2/ri^2)1/2\} + A4 \cdot H^4 + A6 \cdot H^6 + A8 \cdot H^8 + A10 \cdot H^{10}$$

wherein A4, A6, A8 and A10 are 4th-order, 6th-order 8th-order and 10th-order aspherical surface coefficients, respectively.

In table 1, respective values in a numeric value example of the zoom lens 1 according to the first embodiment are shown.

TABLE 1

| si | ri | di | ni | vi |
|---|---|---|---|---|
| s1 | r1 = 50.4272 | d1 = 0.7143 | n1 = 1.58913 | v1 = 61.2526 |
| s2 | r2 = 23.1849 | d2 = 3.8095 | | |
| s3 | r3 = 34.5194 | d3 = 1.4285 | n2 = 1.65844 | v2 = 50.8546 |
| s4 | r4 = −78.6878 | d4 = 0.0476 | | |
| s5 | r5 = 16.8966 | d5 = 0.4520 | n3 = 1.84666 | v3 = 23.7848 |
| s6 | r6 = 11.4598 | d6 = 1.9047 | n4 = 1.45650 | v4 = 90.2697 |
| s7 | r7 = −31.6475 | d7 = 0.3809 | n5 = 1.51680 | v5 = 64.1983 |
| s8 | r8 = 164.8605 | d8 = 0.0476 | | |
| s9 | r9 = 11.8892 | d9 = 1.2455 | n6 = 1.69350 | v6 = 53.2008 |
| s10 | r10 = 19.4598 | d10 = 0.3809 | | |
| s11 | r11 = 34.0912 | d11 = 0.3140 | n7 = 1.88300 | v7 = 40.8054 |
| s12 | r12 = 3.2540 | d12 = 1.4285 | | |
| s13 | r13 = −5.0131 | d13 = 0.1905 | n8 = 1.77250 | v8 = 49.6243 |
| s14 | r14 = 3.6344 | d14 = 0.8444 | n9 = 1.84666 | v9 = 23.7848 |
| s15 | r15 = −64.4255 | d15 = 14.3532 | | |
| s16 Iris | r16 = ∞ | d16 = 0.6905 | | |
| s17 | r17 = 4.7618 | d17 = 0.8070 | n10 = 1.58313 | v10 = 59.4596 |
| s18 | r18 = 13.4520 | d18 = 3.3226 | | |
| s19 | r19 = 5.8528 | d19 = 0.5562 | n11 = 1.58313 | v11 = 59.4596 |
| s20 | r20 = −9.7289 | d20 = 0.2143 | n12 = 1.84666 | v12 = 23.7848 |
| s21 | r21 = 5.8251 | d21 = 0.7084 | n13 = 1.72342 | v13 = 37.9941 |
| s22 | r22 = −5.7626 | d22 = 1.7930 | | |
| s23 | r23 = ∞ | d23 = 1.5178 | n14 = 1.51680 | v14 = 64.1983 |
| s24 | r24 = ∞ | d24 = 0.5714 | | |
| s25 | r25 = ∞ | d25 = 0.2048 | n15 = 1.55232 | v15 = 63.4241 |
| s26 | r26 = ∞ | d26 = 0.3809 | | |
| s27 | r27 = ∞ | d27 = 0.3571 | n16 = 1.55671 | v16 = 58.5624 |
| s28 | r28 = ∞ | d28 = 0.3851 | | |

As shown in the above table 1, surface intervals d10, d15, d18 and d22 are variable in accordance with operation involved with the zooming and focusing of the zoom lens 1. Respective values at the wide-angle end (f=1.00), the telephoto end (f=39.00) and the intermediate focal position (f=19.5) between the wide-angle end and the telephoto end are shown in table 2.

TABLE 2

| | Focal Length (f) | | |
|---|---|---|---|
| | 1.00 | 19.50 | 39.00 |
| | Angle of View (2ω) | | |
| | 67.5 | 3.14 | 1.55 |
| d10 | 0.38095 | 13.06149 | 14.35356 |
| d15 | 14.35319 | 1.67256 | 0.38095 |
| d18 | 3.32261 | 1.73878 | 4.18323 |
| d22 | 1.79302 | 3.37693 | 0.93203 |

Furthermore, in the first lens group Gr1, the third lens group Gr3 and the fourth lens group Gr4, a surface s9 of the sixth lens L6, surfaces s17 and s18 of the tenth lens L10, and a surface s19 of the eleventh lens L11 are each formed into an aspherical surface. In table 3, the 4th-order, 6th-order, 8th-order and 10th-order aspherical surface coefficients A4, A6, A8 and A10 of the surfaces s9, s17, s18 and s19 are shown.

TABLE 3

| ASPHERICAL SURFACE COEFFICIENT | A4 | A6 | A8 | A10 |
|---|---|---|---|---|
| s9 | 1.27E-05 | 9.63E-08 | 2.87E-09 | -4.03E-011 |
| s17 | -1.69E-03 | -1.32E-03 | -6.14E-05 | 1.72E-05 |
| s18 | -8.08E-04 | -1.71E-03 | 2.71E-05 | 1.71E-05 |
| s19 | -4.19E-03 | 1.07E-04 | -1.58E-04 | 3.44E-05 |

Reference character E in the above table 3 indicates an exponential notation with a base 10 (similar in tables 7, 11, 15, and 19 described later).

Table 4 shows values of the conditional formulae (1) to (5) and values of f, Fno and 2ω of the zoom lens 1.

TABLE 4

| No. of Formula | | |
|---|---|---|
| (1) | n1-n2 | 0.3901 |
| (2) | |v1-v2| | 66.49 |
| (3) | |n2-n3| | 0.0603 |
| (4) | v23 | 117.4 |
| (5) | ΔP23 | 0.0925 |
| | f | 1.0~39.00 |
| | Fno | 1.69~4.33 |
| | 2ω | 1.54~67.5 |

Figure 2:
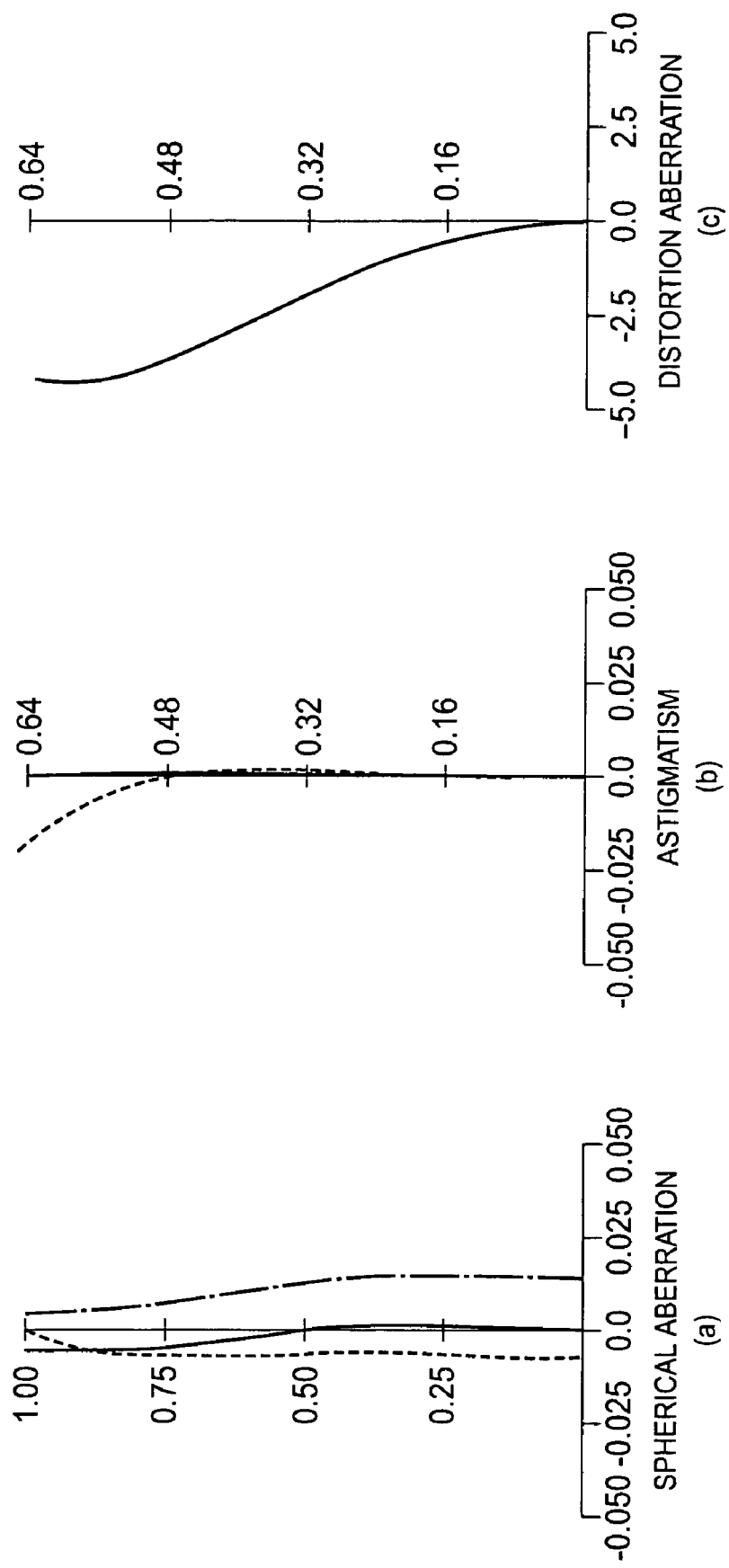
FIG. 2 is charts showing spherical aberration, astigmatism and distortion aberration at a wide-angle end.
Figure 3:
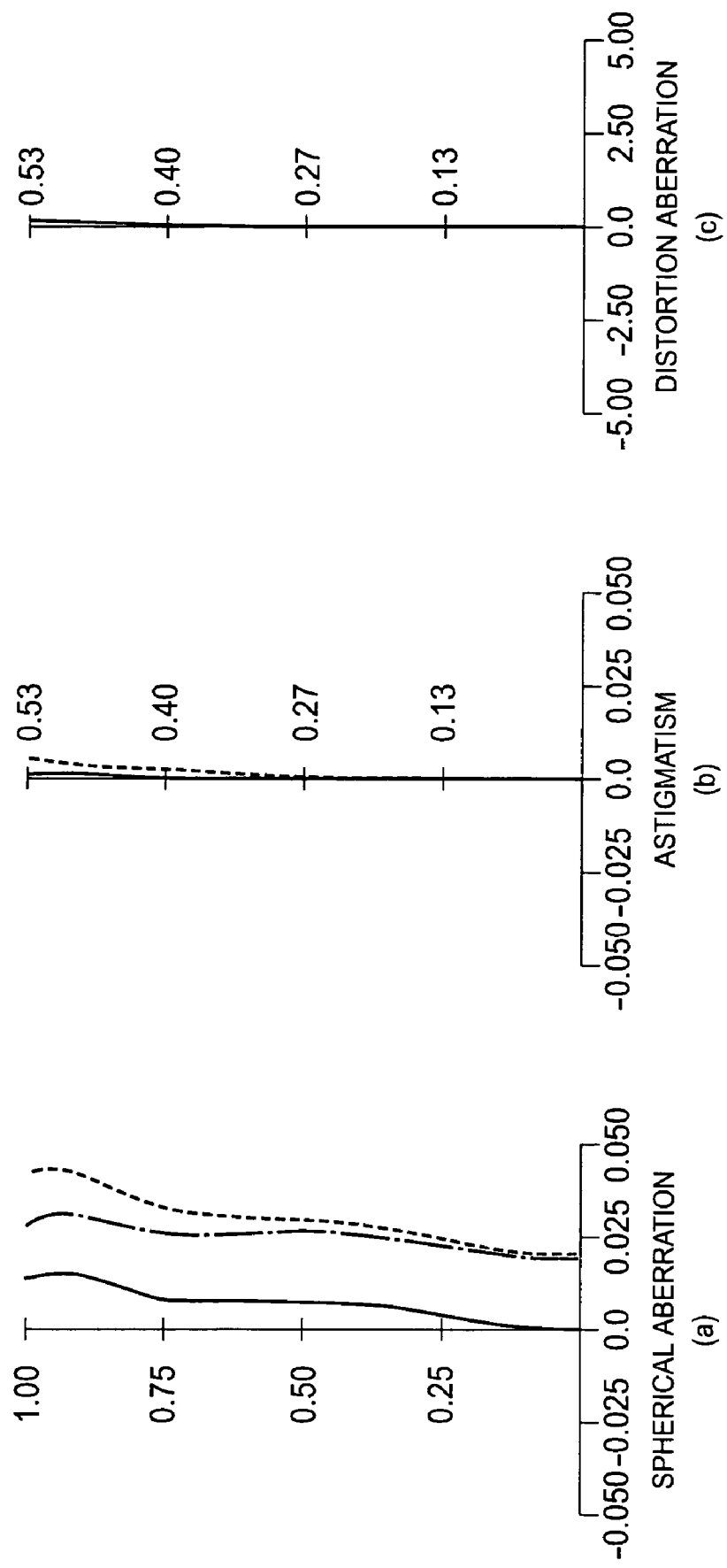
FIG. 3 is charts showing spherical aberration, astigmatism and distortion aberration at an intermediate focal position between the wide-angle end and a telephoto end.
Figure 4:
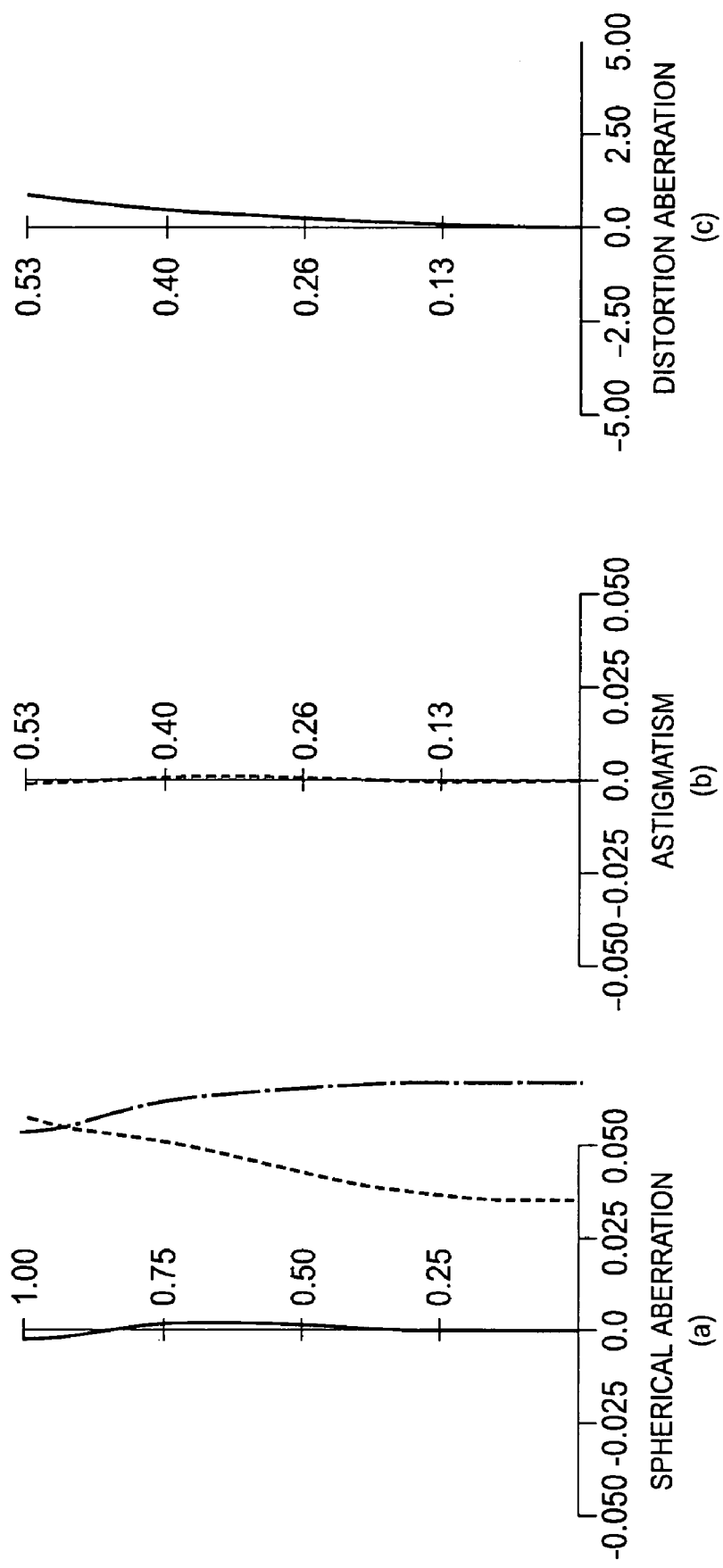
FIG. 4 is charts showing spherical aberration, astigmatism and distortion aberration at the telephoto end.

FIGS. 2 to 4 show spherical aberration charts, astigmatism charts and distortion aberration charts at the wide-angle end, the intermediate focal position between the wide-angle end and the telephoto end, and the telephoto end of the zoom lens 1, respectively. In each of the spherical aberration charts, a solid line denotes a value at a line e, a broken line denotes a value at the line C (wavelength 656.3 nm), a dashed line denotes a value at the line g (wavelength 435.8 nm), and in each of the astigmatism charts, a solid line denotes a value in a sagittal image surface, and a broken line denotes a value in a meridional image surface.

Table 5 shows respective values in a numeric value example of the zoom lens 2 according to the second embodiment.

TABLE 5

| si | ri | di | ni | vi |
|---|---|---|---|---|
| s1 | r1 = 43.1956 | d1 = 1.1017 | n1 = 1.58913 | v1 = 61.2526 |
| s2 | r2 = 40.0010 | d2 = 4.0001 | | |
| s3 | r3 = -457.8264 | d3 = 1.5000 | n2 = 1.65844 | v2 = 50.8546 |
| s4 | r4 = -56.2690 | d4 = 0.9000 | | |
| s5 | r5 = 14.2791 | d5 = 0.9000 | n3 = 1.92286 | v3 = 20.8835 |
| s6 | r6 = 11.5003 | d6 = 2.9194 | n4 = 1.45650 | v4 = 90.2697 |
| s7 | r7 = -21.2417 | d7 = 0.4000 | n5 = 1.51680 | v5 = 64.1983 |
| s8 | r8 = 595.1446 | d8 = 0.0500 | | |
| s9 | r9 = 12.1720 | d9 = 1.1456 | n6 = 1.71300 | v6 = 53.9389 |
| s10 | r10 = 14.6323 | d10 = 0.4000 | | |
| s11 | r11 = 20.4083 | d11 = 0.2250 | n7 = 1.88300 | v7 = 40.8054 |
| s12 | r12 = 3.1099 | d12 = 1.5000 | | |
| s13 | r13 = -3.1147 | d13 = 0.2000 | n8 = 1.77250 | v8 = 49.6243 |
| s14 | r14 = 3.5001 | d14 = 0.7220 | n9 = 1.84666 | v9 = 23.7848 |
| s15 | r15 = -27.8718 | d15 = 15.6859 | | |
| s16 | r16 = ∞ | d16 = 0.7250 | | |
| Iris | | | | |
| s17 | r17 = 5.6740 | d17 = 0.7000 | n10 = 1.58313 | v10 = 59.4596 |
| s18 | r18 = -10.6219 | d18 = 0.4000 | | |
| s19 | r19 = 8.3468 | d19 = 1.0000 | n11 = 1.51680 | v11 = 64.1983 |
| s20 | r20 = ∞ | d20 = 0.6362 | n12 = 1.84666 | v12 = 23.7848 |
| s21 | r21 = 5.7586 | d21 = 4.6364 | | |
| s22 | r22 = 4.4476 | d22 = 0.7570 | n13 = 1.48749 | v13 = 70.4412 |
| s23 | r23 = -6.2578 | d23 = 0.4274 | | |
| s24 | r24 = ∞ | d24 = 1.5937 | n14 = 1.51680 | v14 = 64.1983 |
| s25 | r25 = ∞ | d25 = 0.6000 | | |
| s26 | r26 = ∞ | d26 = 0.2150 | n15 = 1.55232 | v15 = 63.4241 |
| s27 | r27 = ∞ | d27 = 0.4000 | | |
| s28 | r28 = ∞ | d28 = 0.3750 | n16 = 1.55671 | v16 = 58.5624 |
| s29 | r29 = ∞ | d29 = 0.398199 | | |

As shown in the above table 5, surface intervals d10, d15, d21 and d23 are variable in accordance with operation involved with the zooming and focusing of the zoom lens 2. Respective values of d10, d15, d21 and d23 at the wide-angle end (f=1.00), the telephoto end (f=40.00) and the intermediate focal position (f=20.00) between the wide-angle end and the telephoto end are shown in table 6.

TABLE 6

| | Focal Length (f) | | |
|---|---|---|---|
| | 1.00 | 20.00 | 40.00 |
| | Angle of View (2ω) | | |
| | 69.2 | 3.24 | 1.60 |
| d10 | 0.40001 | 14.20236 | 15.68574 |
| d15 | 15.68586 | 1.8835 | 0.40001 |
| d21 | 4.6364 | 0.8516 | 1.93045 |
| d23 | 0.42737 | 4.21218 | 3.13345 |

Furthermore, in the first lens group Gr1, the third lens group Gr3 and the fourth lens group Gr4, a surface s10 of the sixth lens L6, surfaces s17 and s18 of the tenth lens L10, and surfaces s21, 23 of the thirteenth lens L13 are each formed into an aspherical surface. In table 7, the 4th-order, 6th-order, 8th-order and 10th-order aspherical surface coefficients A4, A6, A8 and A10 of the surfaces s10, s17, s18, s21 and s23 are shown.

TABLE 7

| ASPHERICAL SURFACE COEFFICIENT | A4 | A6 | A8 | A10 |
|---|---|---|---|---|
| s9 | 1.20E-06 | -1.52E-07 | 9.54E-09 | -1.70E-10 |
| s17 | 5.34E-04 | -3.68E-04 | 1.36E-04 | 1.71E-05 |

TABLE 7-continued

| ASPHERICAL SURFACE COEFFICIENT | A4 | A6 | A8 | A10 |
|---|---|---|---|---|
| s18 | 2.33E-03 | -4.69E-04 | 1.88E-04 | 1.04E-05 |
| s22 | -5.42E-04 | 4.06E-05 | -1.81E-04 | 1.09E-04 |
| s23 | 3.35E-03 | -7.96E-05 | -1.13E-04 | 9.91E-05 |

Table 8 shows values of the conditional formulae (1) to (5) and values of f, Fno and 2ω of the zoom lens 2.

TABLE 8

| No. of Formula | | |
|---|---|---|
| (1) | n1-n2 | 20.4664 |
| (2) | |v1-v2| | 69.39 |
| (3) | |n2-n3| | 0.0603 |
| (4) | v23 | 173.6 |
| (5) | ΔP23 | 0.1901 |
| | f | 1.0~40.00 |
| | Fno | 2.22~4.00 |
| | 2ω | 1.6~69.2 |

Figure 6:
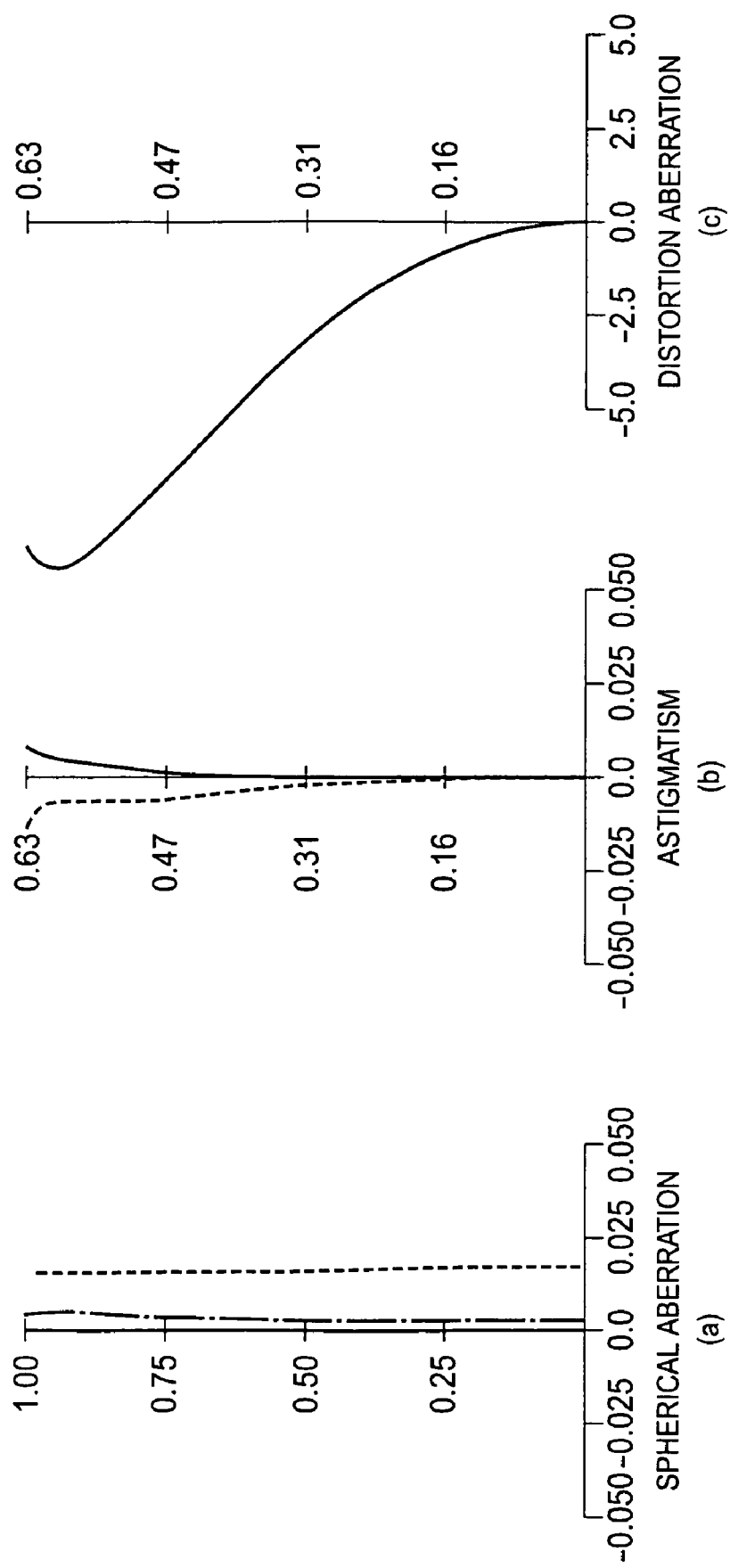
FIG. 6 is charts showing spherical aberration, astigmatism and distortion aberration at a wide-angle end.
Figure 7:
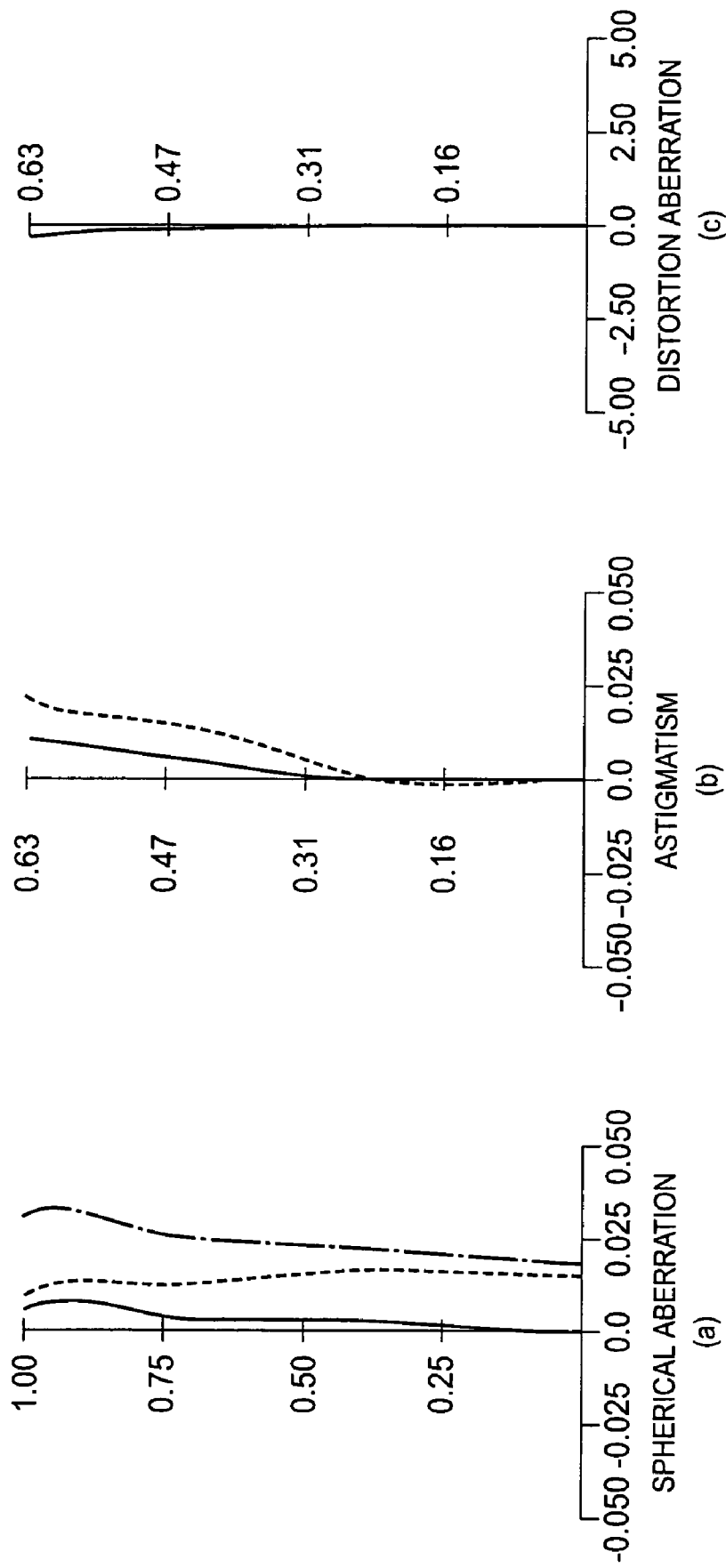
FIG. 7 is charts showing spherical aberration, astigmatism and distortion aberration at an intermediate focal position between the wide-angle end and a telephoto end.
Figure 8:
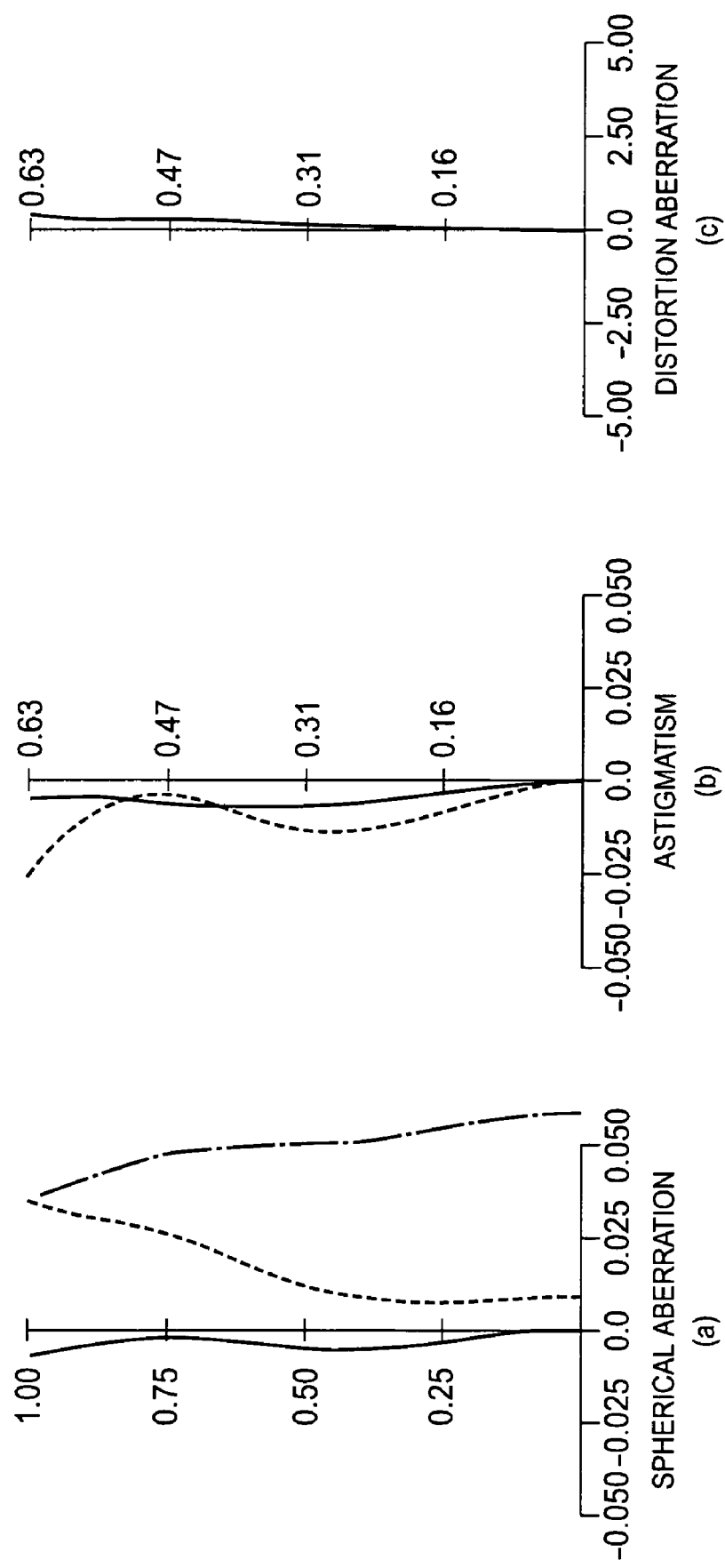
FIG. 8 is charts showing spherical aberration, astigmatism and distortion aberration at the telephoto end.

FIGS. 6 to 8 show spherical aberration charts, astigmatism charts and distortion aberration charts at the wide-angle end, the intermediate focal position between the wide-angle end and the telephoto end of the zoom lens 2, respectively. In each of the spherical aberration charts, a solid line denotes a value at the line e, a broken line denotes a value at the line C (wavelength 656.3 nm), a dashed line denotes a value at the line g (wavelength 435.8 nm), and in each of the astigmatism charts, a solid line denotes a value in the sagittal image surface, and a broken line denotes a value in the meridional image surface.

Table 9 shows respective values in a numeric value example of the zoom lens 3 according to the third embodiment.

TABLE 9

| si | ri | di | ni | vi |
|---|---|---|---|---|
| s1 | r1 = 135.0548 | d1 = 1.6367 | n1 = 1.58913 | v1 = 61.3 |
| s2 | r2 = 21.9858 | d2 = 6.3098 | | |
| s3 | r3 = 87.9983 | d3 = 2.7379 | n2 = 1.65844 | v2 = 50.9 |
| s4 | r4 = -151.9657 | d4 = 0.2842 | | |
| s5 | r5 = 54.8202 | d5 = 1.0690 | n3 = 1.69680 | v3 = 55.5 |
| s6 | r6 = 27.0625 | d6 = 6.3819 | | |
| s7 | r7 = 55.0902 | d7 = 2.9200 | n4 = 1.48749 | v4 = 70.4 |
| s8 | r8 = -47.7401 | d8 = 0.3016 | | |
| s9 | r9 = 22.1424 | d9 = 0.9025 | n5 = 1.84666 | v5 = 23.8 |
| s10 | r10 = 15.9194 | d10 = 5.1095 | n6 = 1.45650 | v6 = 90.3 |
| s11 | r11 = -22.6561 | d11 = 0.6837 | n7 = 1.51680 | v7 = 64.2 |
| s12 | r12 = -124.6613 | d12 = 0.3247 | | |
| s13 | r13 = 15.9313 | d13 = 2.3449 | n8 = 1.48749 | v8 = 70.4 |
| s14 | r14 = -183.8100 | d14 = 0.5368 | | |
| s15 | r15 = 91.4222 | d15 = 0.2735 | n9 = 1.88300 | v9 = 40.8 |
| s16 | r16 = 3.6956 | d16 = 1.0809 | | |
| s17 | r17 = -4.6904 | d17 = 0.9454 | n10 = 1.77250 | v10 = 49.6 |
| s18 | r18 = 3.3394 | d18 = 1.6882 | n11 = 1.84666 | v11 = 23.8 |
| s19 | r19 = 45.5199 | d19 = 14.8645 | | |
| s20 Iris | r20 = ∞ | d20 = 0.6047 | | |
| s21 | r21 = 11.1968 | d21 = 1.3505 | n12 = 1.58913 | v12 = 61.3 |
| s22 | r22 = -10.4032 | d22 = 0.2665 | | |
| s23 | r23 = 11.0257 | d23 = 0.5414 | n13 = 1.84666 | v13 = 23.8 |
| s24 | r24 = 5.2712 | d24 = 1.3392 | n14 = 1.58913 | v14 = 61.3 |
| s25 | r25 = -13.1584 | d25 = 0.4727 | | |
| s26 | r26 = -12.2901 | d26 = 0.4840 | n15 = 1.80420 | v15 = 46.5 |
| s27 | r27 = 11.4654 | d27 = 0.6227 | | |
| s28 | r28 = -14.1912 | d28 = 1.4856 | n16 = 1.64769 | v16 = 33.8 |

TABLE 9-continued

| si | ri | di | ni | vi |
|---|---|---|---|---|
| s29 | r29 = 4.9588 | d29 = 1.4856 | n17 = 1.84666 | v17 = 23.8 |
| s30 | r30 = 165.9091 | d30 = 6.8242 | | |
| s31 | r31 = 13.0236 | d31 = 1.5531 | n18 = 1.48749 | v18 = 70.4 |
| s32 | r32 = -8.8958 | d32 = 0.3449 | | |
| s33 | r33 = 5.1931 | d33 = 2.0490 | n19 = 1.58913 | v19 = 61.3 |
| s34 | r34 = -4.9541 | d34 = 0.7020 | n20 = 1.84666 | v20 = 23.8 |
| s35 | r35 = -146.0034 | d35 = 1.2800 | | |
| s36 Filter | r36 = ∞ | d36 = 1.6731 | nFL = 1.51680 | vFL = 64.2 |
| s37 Filter | r37 = ∞ | | | |

As shown in the above table 9, surface intervals d14, d19, d25 and d30 are variable in accordance with operation involved with the zooming and focusing of the zoom lens 3. Respective values of d14, d19, d25 and d30 at the wide-angle end (f=1.00), the telephoto end (f=39.02) and the intermediate focal position (f=17.45) between the wide-angle end and the telephoto end are shown in table 10.

TABLE 10

| | Focal Length (f) | | |
|---|---|---|---|
| | 1.00 | 17.45 | 39.02 |
| | Angle of View (2ω) | | |
| | 82.95 | 5.71 | 2.50 |
| d14 | 0.5368 | 12.8688 | 14.1923 |
| d19 | 14.8645 | 2.5320 | 1.2091 |
| d25 | 0.4727 | 5.5619 | 3.5454 |
| d30 | 6.8242 | 1.7355 | 3.7528 |

Furthermore, in the third lens group Gr3 and the fifth lens group Gr5, a surface s21 of the thirteenth lens L13, a surface s33 of the nineteenth lens L19 are each formed into an aspherical surface. In table 11, the 4th-order, 6th-order, 8th-order and 10th-order aspherical surface coefficients A4, A6, A8 and A10 of the surfaces s21 and s33 are shown.

TABLE 11

| ASPHERICAL SURFACE COEFFICIENT | A4 | A6 | A8 | A10 |
|---|---|---|---|---|
| s21 | -6.270E-04 | -1.815E-05 | 3.070E-06 | -1.531E-07 |
| s33 | 1.307E-04 | -4.900E-05 | 1.077E-05 | -2.187E-07 |

Table 12 shows values of the conditional formulae (1) to (5) and values of f, Fno and 2ω of the zoom lens 1.

TABLE 12

| No. of Formula | | |
|---|---|---|
| (1) | n1-n2 | 0.3902 |
| (2) | |v1-v2| | 66.5 |
| (3) | |n2-n3| | 0.0603 |
| (4) | v23 | 119.1 |
| (5) | ΔP23 | 0.0955 |
| | f | 1.0~39.02 |
| | Fno | 1.87~3.50 |
| | 2ω | 2.50~82.95 |

Figure 10:
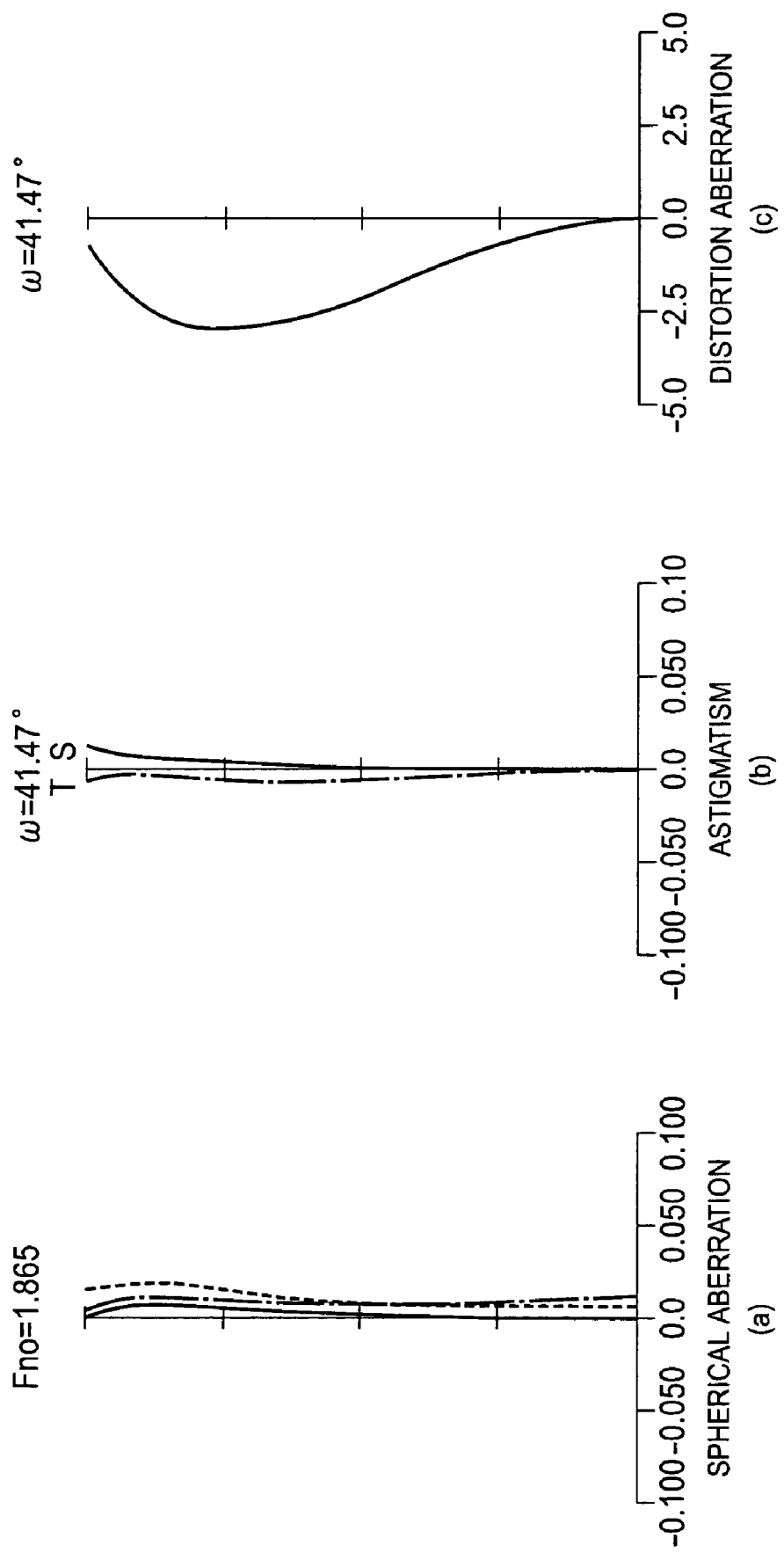
FIG. 10 is charts showing spherical aberration, astigmatism and distortion aberration at a wide-angle end.
Figure 11:
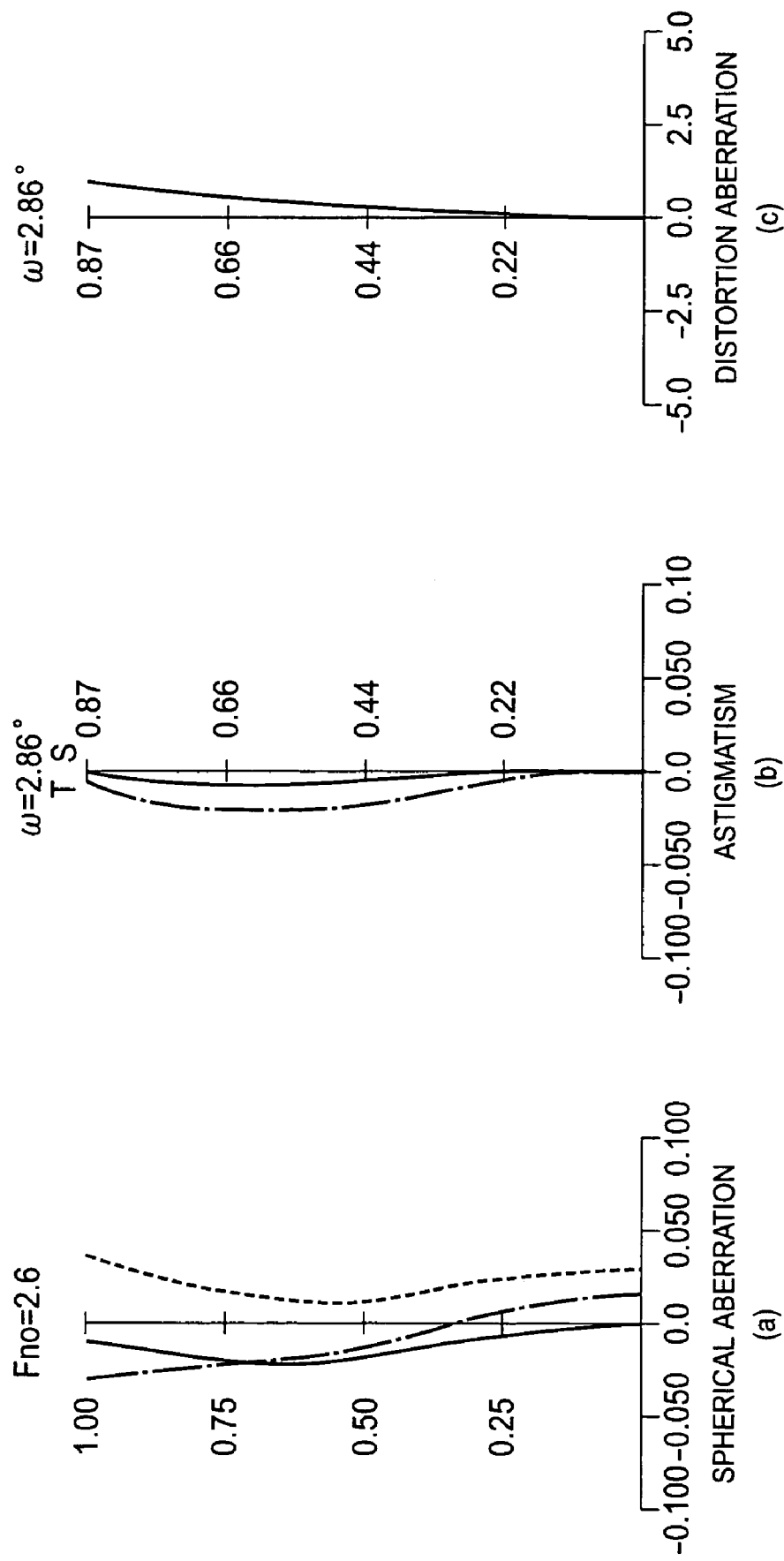
FIG. 11 is charts showing spherical aberration, astigmatism and distortion aberration at an intermediate focal position between the wide-angle end and a telephoto end.
Figure 12:
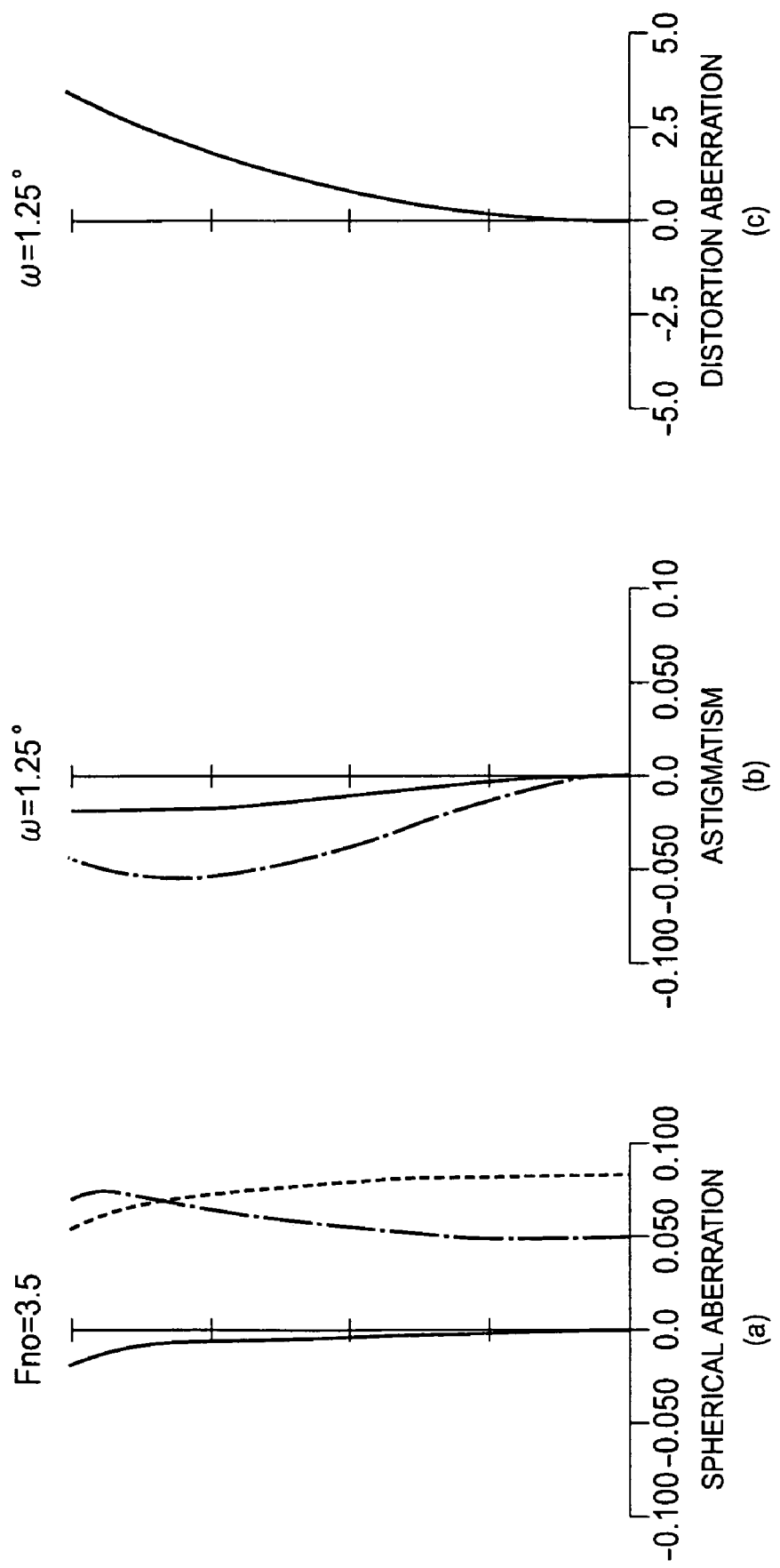
FIG. 12 is charts showing spherical aberration, astigmatism and distortion aberration at the telephoto end.

FIGS. 10 to 12 show spherical aberration charts, astigmatism charts and distortion aberration charts at the wide-angle end, the intermediate focal position between the wide-angle end and the telephoto end, and the telephoto end of the zoom lens 1, respectively. In each of the spherical aberration charts, a solid line denotes a value at the line e, a broken line denotes a value at the line C (wavelength 656.3 nm), a dashed line denotes a value at the line g (wavelength 435.8 nm), and in each of the astigmatism charts, a solid line denotes a value in the sagittal image surface, and a broken line denotes a value in the meridional image surface.

Table 13 shows respective values in a numeric value example of the zoom lens 4 according to the fourth embodiment.

TABLE 13

| si | ri | di | ni | vi |
|---|---|---|---|---|
| s1 | r1 = 66.2882 | d1 = 1.6539 | n1 = 1.58913 | v1 = 61.3 |
| s2 | r2 = 20.6541 | d2 = 6.4156 | | |
| s3 | r3 = 49.1034 | d3 = 3.3840 | n2 = 1.65844 | v2 = 50.9 |
| s4 | r4 = −572.0262 | d4 = 0.2347 | | |
| s5 | r5 = 58.5826 | d5 = 1.0650 | n3 = 1.6980 | v3 = 55.5 |
| s6 | r6 = 24.3020 | d6 = 5.8909 | | |
| s7 | r7 = 46.5948 | d7 = 3.3143 | n4 = 1.48749 | v4 = 70.4 |
| s8 | r8 = −66.8306 | d8 = 0.3892 | | |
| s9 | r9 = 24.7720 | d9 = 0.5195 | n5 = 1.84666 | v5 = 23.8 |
| s10 | r10 = 16.7406 | d10 = 5.3035 | n6 = 1.49700 | v6 = 81.6 |
| s11 | r11 = −22.2555 | d11 = 0.5454 | n7 = 1.51680 | v7 = 64.2 |
| s12 | r12 = −115.7020 | d12 = 0.2226 | | |
| s13 | r13 = 15.1221 | d13 = 2.2851 | n8 = 1.48749 | v8 = 70.4 |
| s14 | r14 = −251.5416 | d14 = 0.4697 | | |
| s15 | r15 = −176.6693 | d15 = 0.2684 | n9 = 1.88300 | v9 = 40.8 |
| s16 | r16 = 3.7243 | d16 = 1.0796 | | |
| s17 | r17 = −4.9431 | d17 = 0.8723 | n10 = 1.77250 | v10 = 49.6 |
| s18 | r18 = 3.1824 | d18 = 1.5335 | n11 = 1.84666 | v11 = 23.8 |
| s19 | r19 = 42.0484 | d19 = 14.5700 | | |
| s20 | r20 = ∞ (Iris) | d20 = 0.6009 | | |
| s21 | r21 = 10.9772 | d21 = 1.3420 | n12 = 1.58913 | v12 = 61.3 |
| s22 | r22 = −10.1735 | d22 = 0.1715 | | |
| s23 | r23 = 12.1984 | d23 = 0.5412 | n13 = 1.84666 | v13 = 23.8 |
| s24 | r24 = 5.2935 | d24 = 1.3420 | n14 = 1.58913 | v14 = 61.3 |
| s25 | r25 = −11.5611 | d25 = 0.4760 | | |
| s26 | r26 = −11.1945 | d26 = 0.5625 | n15 = 1.80420 | v15 = 46.5 |
| s27 | r27 = 12.9747 | d27 = 0.7027 | | |
| s28 | r28 = −9.2151 | d28 = 1.4091 | n16 = 1.64769 | v16 = 33.8 |
| s29 | r29 = 5.1631 | d29 = 1.4091 | n17 = 1.84666 | v17 = 23.8 |
| s30 | r30 = −46.6994 | d30 = 7.1656 | | |
| s31 | r31 = 12.3391 | d31 = 1.5433 | n18 = 1.48749 | v18 = 70.4 |
| s32 | s32 = −10.7894 | d32 = 0.5325 | | |
| s33 | s33 = 5.2113 | d33 = 2.2467 | n19 = 1.58913 | v19 = 61.3 |
| s34 | s34 = −4.2705 | d34 = 0.6855 | n20 = 1.84666 | v20 = 23.8 |
| s35 | s35 = −31.8581 | d35 = 1.2719 | | |
| s36 | s36 = ∞ (Filter) | d36 = 1.6625 | nFL = 1.51680 | vFL = 64.2 |
| s37 | s37 = ∞ (Filter) | d37 = 0.7970 0.0000 | | |

As shown in the above table 13, surface intervals d14, d19, d25 and d30 are variable in accordance with operation involved with the zooming and focusing of the zoom lens 4. Respective values of d14, d19, d25 and d30 at the wide-angle end (f=1.00), the telephoto end (f=39.13) and the intermediate focal position (f=19.56) between the wide-angle end and the telephoto end are shown in table 14.

TABLE 14

| | Focal Length (f) | | |
|---|---|---|---|
| | 1.00 | 19.56 | 39.13 |
| | Angle of View (2ω) | | |
| | 82.21 | 5.08 | 2.46 |
| d14 | 0.5368 | 12.8688 | 14.1923 |
| d19 | 14.8645 | 2.5320 | 1.2091 |
| d25 | 0.4727 | 5.5619 | 3.5454 |
| d30 | 6.8242 | 1.7355 | 3.7528 |

Furthermore, in the third lens group Gr3 and the fifth lens group Gr5, a surface s21 of the thirteenth lens L13, a surface s33 of the nineteenth lens L19 are each formed into an aspherical surface. In table 15, the 4th-order, 6th-order, 8th-order and 10th-order aspherical surface coefficients A4, A6, A8 and A10 of the surfaces s21 and s33 are shown.

TABLE 15

| ASPHERICAL SURFACE COEFFICIENT | A4 | A6 | A8 | A10 |
|---|---|---|---|---|
| s21 | −6.546E−04 | −2.577E−05 | 4.316E−06 | −2.326E−07 |
| s33 | 1.882E−04 | 1.641E−05 | −1.887E−06 | 1.300E−06 |

Table 16 shows values of the conditional formulae (1) to (5) and values of f, Fno and 2ω of the zoom lens 4.

TABLE 16

| No. of Formula | | |
|---|---|---|
| (1) | n1-n2 | 0.3497 |
| (2) | |v1-v2| | 57.8 |
| (3) | |n2-n3| | 0.0198 |
| (4) | v23 | 87.8 |
| (5) | ΔP23 | 0.0396 |
| | f | 1.0~39.02 |
| | Fno | 1.88~3.00 |
| | 2ω | 2.45~83.03 |

Figure 15:
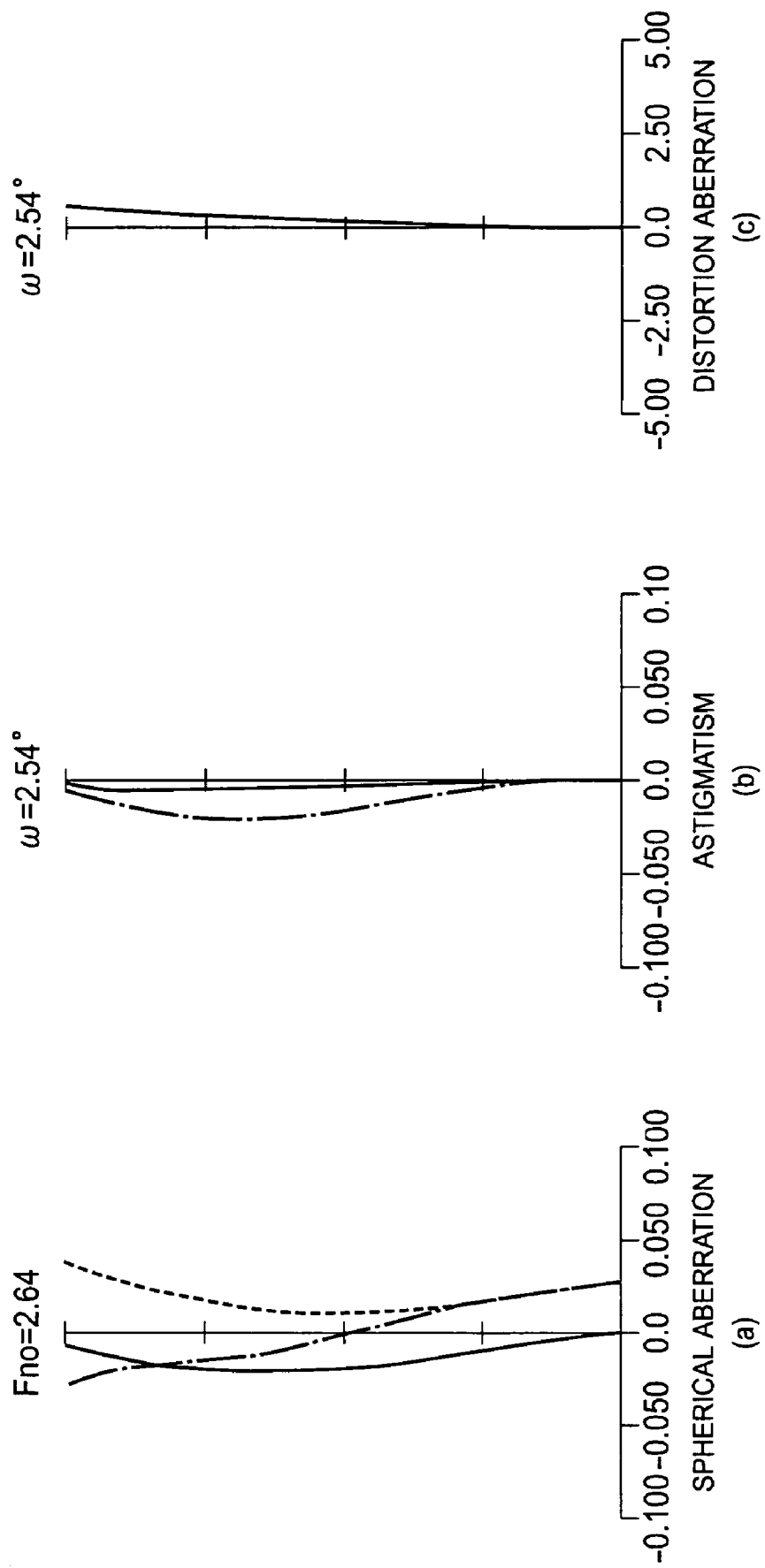
FIG. 15 is charts showing spherical aberration, astigmatism and distortion aberration at an intermediate focal position between the wide-angle end and a telephoto end.
Figure 16:
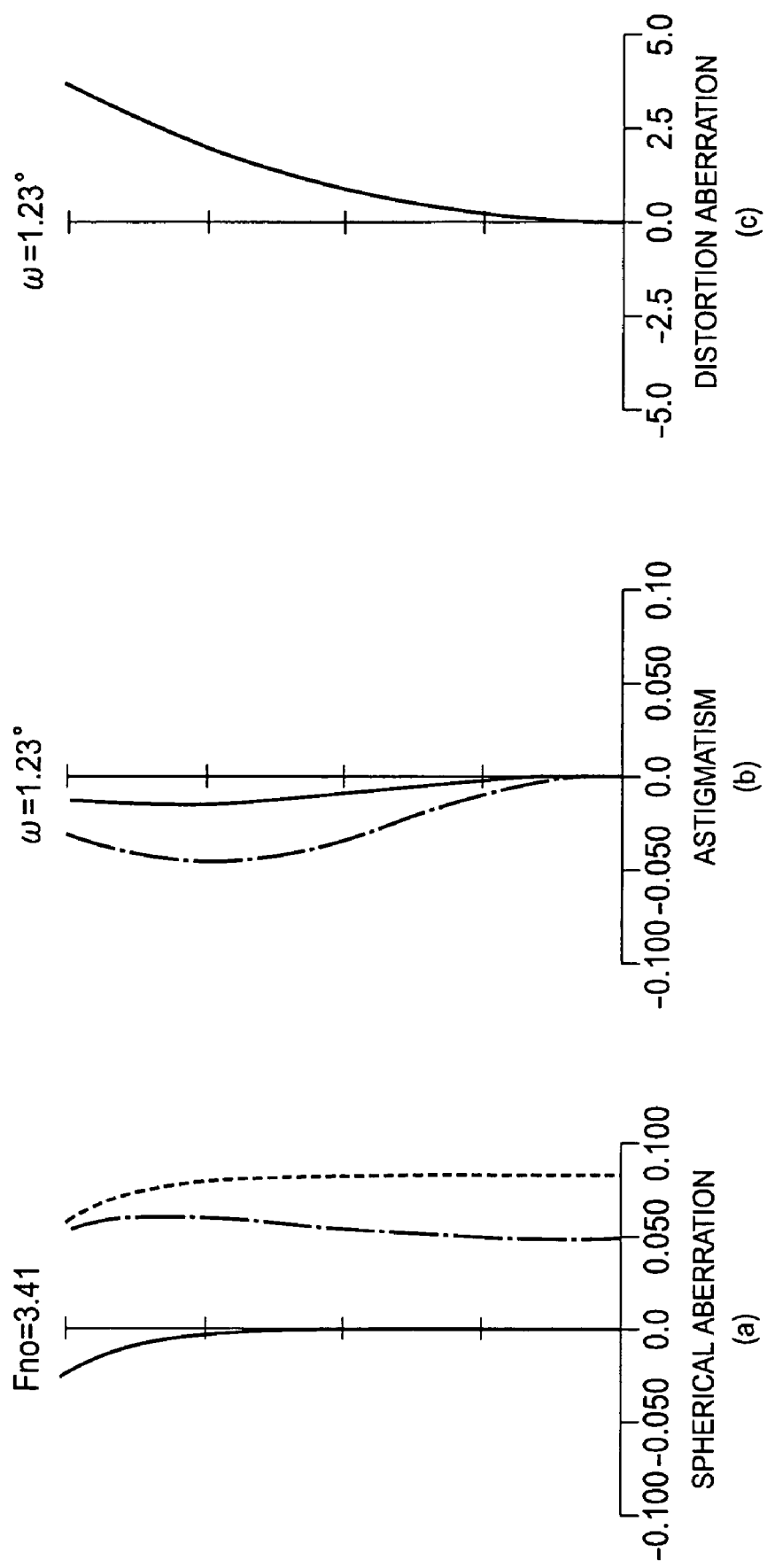
FIG. 16 is charts showing spherical aberration, astigmatism and distortion aberration at the telephoto end.

FIGS. 14 to 16 show spherical aberration charts, astigmatism charts and distortion aberration charts at the wide-angle end, the intermediate focal position between the wide-angle end and the telephoto end, and the telephoto end of the zoom lens 4, respectively. In each of the spherical aberration charts, a solid line denotes a value at the line e, a broken line denotes a value at the line C (wavelength 656.3 nm), a dashed line denotes a value at the line g (wavelength 435.8 nm), and in each of the astigmatism charts, a solid line denotes a value in the sagittal image surface, and a broken line denotes a value in the meridional image surface.

Table 17 shows respective values in a numeric value example of the zoom lens 5 according to the fifth embodiment.

TABLE 17

| si | ri | di | ni | vi |
|---|---|---|---|---|
| s1 | r1 = 138.4722 | d1 = 1.8107 | n1 = 1.58913 | v1 = 61.3 |
| s2 | r2 = 22.4749 | d2 = 9.5463 | | |
| s3 | r3 = 204.2751 | d3 = 4.7628 | n2 = 1.65844 | v2 = 50.9 |
| s4 | r4 = −77.7380 | d4 = 6.0572 | | |
| s5 | r5 = 41.8463 | d5 = 0.8308 | n3 = 1.88300 | v3 = 40.8 |
| s6 | r6 = 21.4914 | d6 = 3.7774 | n4 = 1.48749 | v4 = 70.4 |
| s7 | r7 = −88.7216 | d7 = 0.0692 | | |
| s8 | r8 = 23.0428 | d8 = 0.6777 | n5 = 1.84666 | v5 = 23.8 |
| s9 | r9 = 17.7950 | d9 = 4.0167 | n6 = 1.45650 | v6 = 90.3 |
| s10 | r10 = −30.0894 | d10 = 0.4154 | n7 = 1.51680 | v7 = 64.2 |
| s11 | r11 = −1498.1836 | d11 = 0.0692 | | |
| s12 | r12 = 17.1194 | d12 = 2.3660 | n8 = 1.48749 | v8 = 70.4 |
| s13 | r13 = −159.8185 | d13 = 0.4847 | | |
| s14 | r14 = 61.0411 | d14 = 0.2769 | n9 = 1.88300 | v9 = 40.8 |
| s15 | r15 = 3.8574 | d15 = 1.2958 | | |
| s16 | r16 = −5.0162 | d16 = 1.0385 | n10 = 1.77250 | v10 = 49.6 |
| s17 | r17 = 3.5572 | d17 = 1.5652 | n11 = 1.84666 | v11 = 23.8 |
| s18 | r18 = 49.6140 | d18 = 15.8004 | | |
| s19 Iris | r19 = ∞ | d19 = 0.6200 | | |
| s20 | r20 = 10.7776 | d20 = 2.1463 | n12 = 1.58913 | v12 = 61.3 |
| s21 | r21 = −13.2443 | d21 = 0.2769 | | |
| s22 | r22 = 12.0398 | d22 = 1.1230 | n13 = 1.84666 | v13 = 23.8 |
| s23 | r23 = 5.2197 | d23 = 1.4341 | n14 = 1.58913 | v14 = 61.3 |

TABLE 17-continued

| si | ri | di | ni | vi |
|---|---|---|---|---|
| s24 | r24 = −11.6001 | d24 = 0.4847 | | |
| s25 | r25 = −15.6400 | d25 = 0.2769 | n15 = 1.80420 | v15 = 46.5 |
| s26 | r26 = 15.5021 | d26 = 0.2883 | | |
| s27 | r27 = −28.0035 | d27 = 0.2769 | n16 = 1.64769 | v16 = 33.8 |
| s28 | r28 = 4.1174 | d28 = 0.6246 | n17 = 1.84666 | v17 = 23.8 |
| s29 | r29 = 16.4185 | d29 = 6.5532 | | |
| s30 | r30 = 14.9482 | d30 = 0.9614 | n18 = 1.48749 | v18 = 70.4 |
| s31 | r31 = −10.0348 | d31 = 0.0692 | | |
| s32 | r32 = 4.4209 | d32 = 1.5644 | n19 = 1.58913 | v19 = 61.3 |
| s33 | r33 = −7.2877 | d33 = 0.2769 | n20 = 1.84666 | v20 = 23.8 |
| s34 | r34 = 125.4468 | d34 = 1.3124 | | |
| s35 Filter | r35 = ∞ | d35 = 1.7154 | nFL = 1.51680 | vFL = 64.2 |
| s36 Filter | r36 = ∞ | | | |

As shown in the above table 17, the surface intervals d13, d18, d24 and d29 are variable in accordance with operation involved with the zooming and focusing of the zoom lens 5. Respective values of d13, d18, d24 and d29 at the wide-angle end (f=1.00), the telephoto end (f=40.08) and the intermediate focal position (f=20.01) between the wide-angle end and the telephoto end are shown in table 18.

TABLE 18

| | Focal Length (f) | | |
|---|---|---|---|
| | 1.00 | 20.1 | 40.08 |
| | Angle of View (2ω) | | |
| | 87.93 | 5.71 | 2.51 |
| d14 | 0.4847 | 13.8656 | 15.5227 |
| d18 | 15.8004 | 2.4194 | 0.7616 |
| d24 | 0.4847 | 5.8630 | 0.6428 |
| d29 | 6.5532 | 1.1770 | 6.4017 |

Furthermore, in the third lens group Gr3 and the fifth lens group Gr5, a surface s20 of the thirteenth lens L13, a surface s32 of the nineteenth lens L19 are each formed into an aspherical surface. In table 19, the 4th-order, 6th-order, 8th-order and 10th-order aspherical surface coefficients A4, A6, A8 and A10 of the surfaces s20 and s32 are shown.

TABLE 19

| ASPHERICAL SURFACE COEFFICIENT | A4 | A6 | A8 | A10 |
|---|---|---|---|---|
| s20 | −5.873E−04 | −1.478E−05 | 1.957E−06 | −7.235E−08 |
| s32 | 1.087E−04 | −1.617E−04 | 3.288E−05 | −2.183E−06 |

Table 20 shows values of the conditional formulae (1) to (5) and values of f, Fno and 2ω of the zoom lens 5.

TABLE 20

| No. of Formula | | |
|---|---|---|
| (1) | n1-n2 | 0.3902 |
| (2) | |v1-v2| | 66.5 |
| (3) | |n2-n3| | 0.0603 |
| (4) | v23 | 128.7 |
| (5) | ΔP23 | 0.1122 |
| | f | 1.0~40.08 |
| | Fno | 1.82~3.41 |
| | 2ω | 2.51~87.9 |

Figure 18:
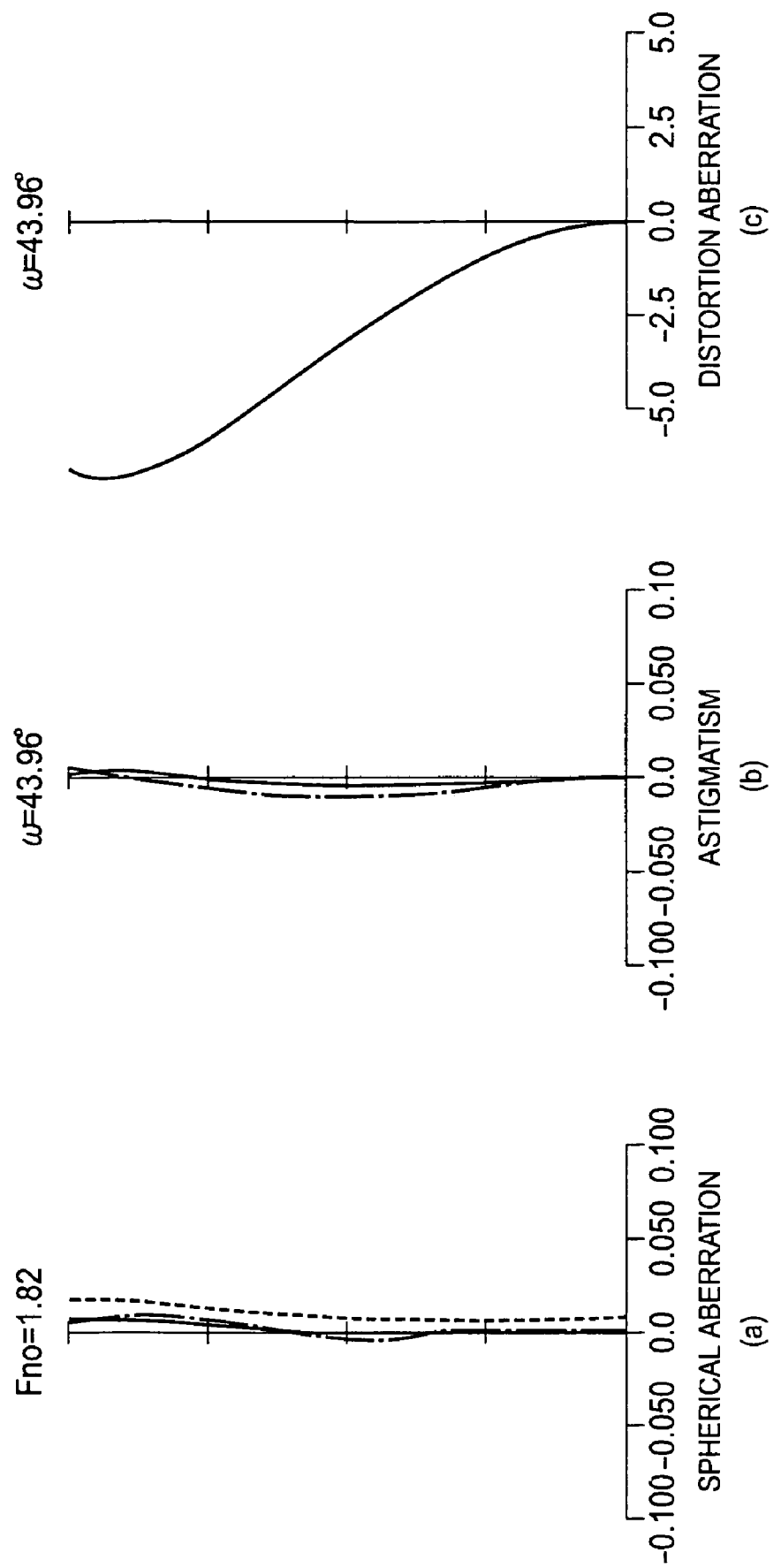
FIG. 18 is charts showing spherical aberration, astigmatism and distortion aberration at a wide-angle end.
Figure 19:
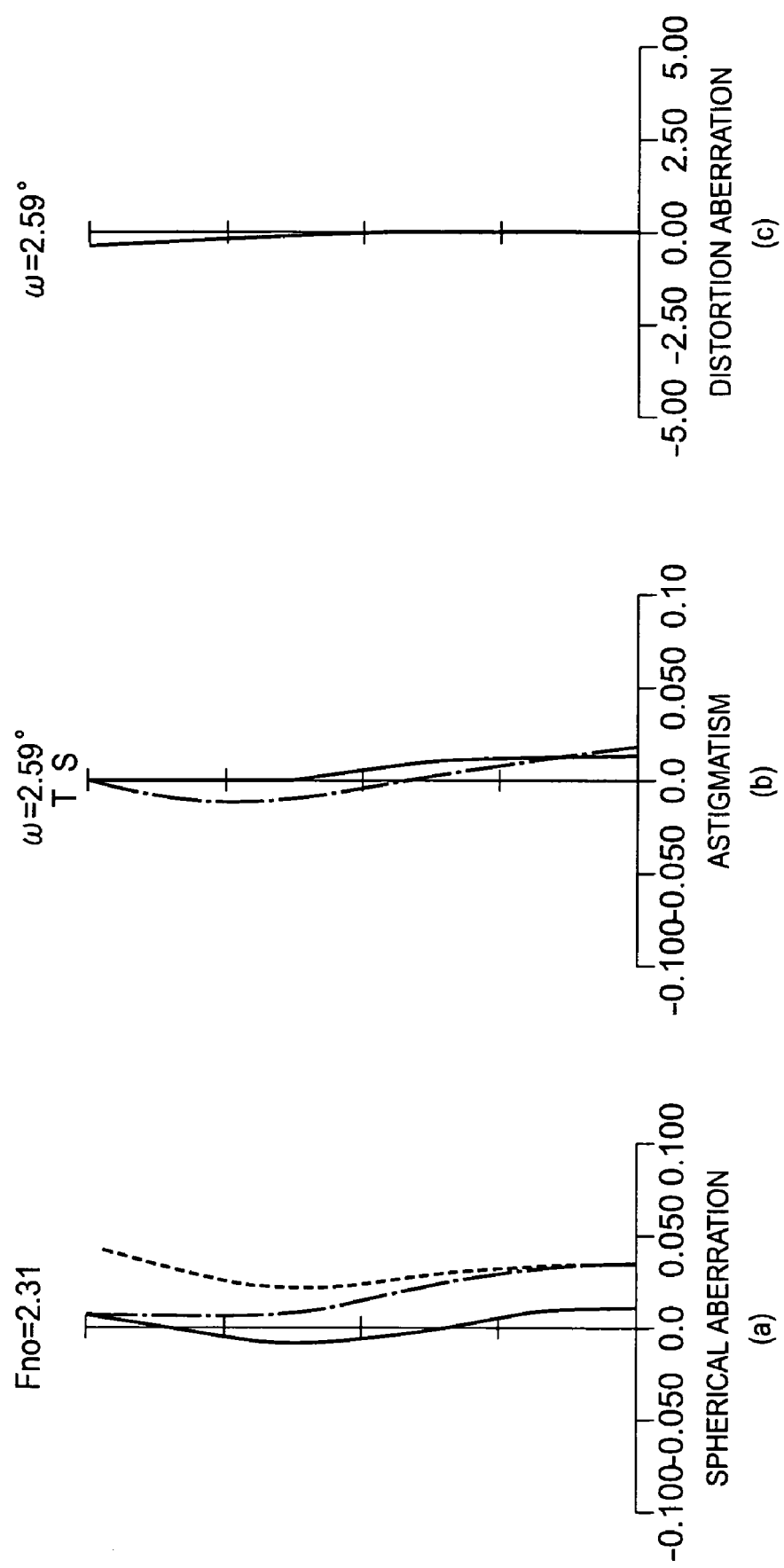
FIG. 19 is charts showing spherical aberration, astigmatism and distortion aberration at an intermediate focal position between the wide-angle end and a telephoto end.
Figure 20:
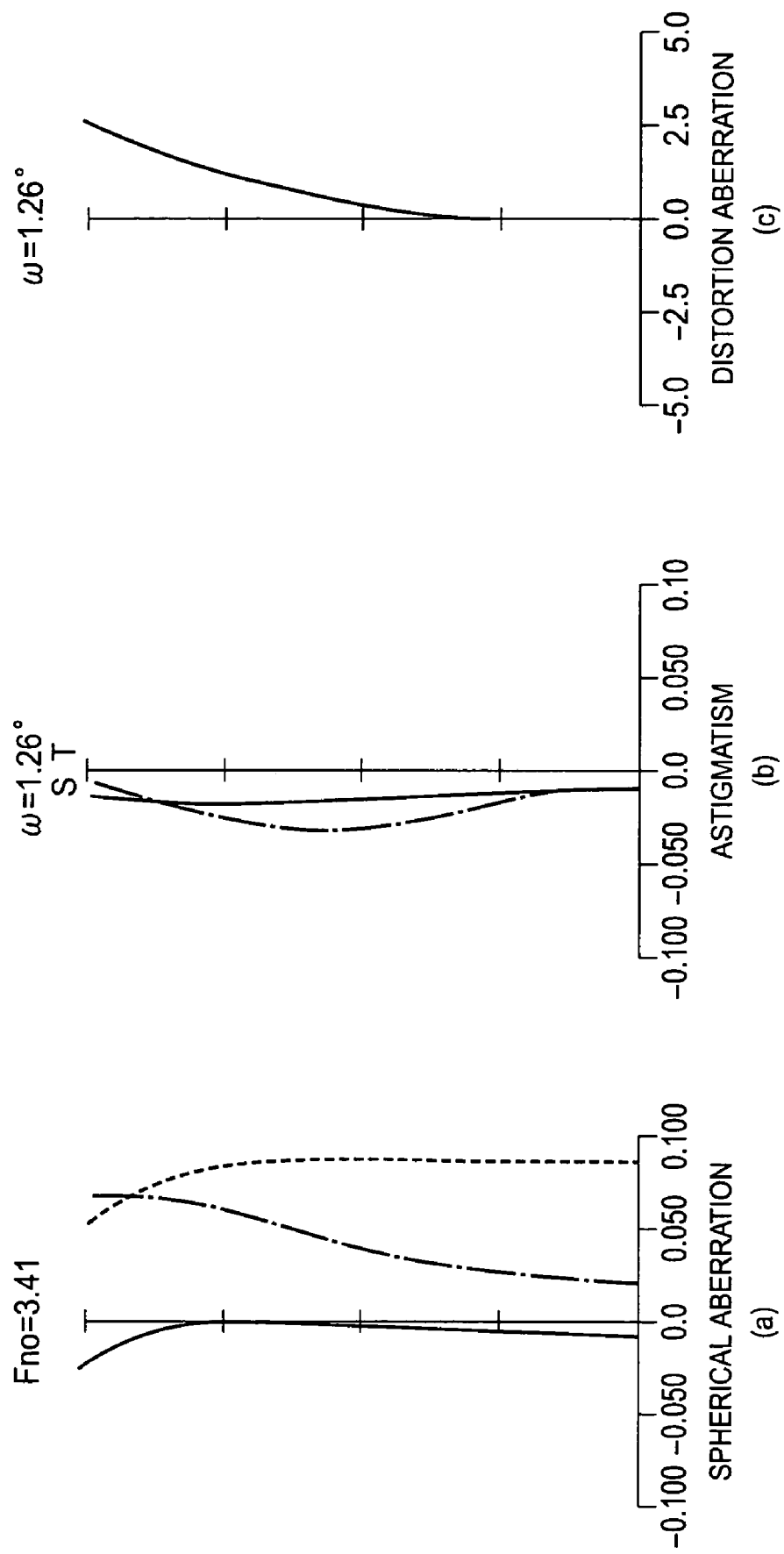
FIG. 20 is charts showing spherical aberration, astigmatism and distortion aberration at the telephoto end.

FIGS. 18 to 20 show spherical aberration charts, astigmatism charts and distortion aberration charts at the wide-angle end, the intermediate focal position between the wide-angle end and the telephoto end, and the telephoto end of the zoom lens 5, respectively. In each of the spherical aberration charts, a solid line denotes a value at the line e, a broken line denotes a value at the line C (wavelength 656.3 nm), a dashed line denotes a value at the line g (wavelength 435.8 nm), and in each of the astigmatism charts, a solid line denotes a value in the sagittal image surface, and a broken line denotes a value in the meridional image surface.

As described above, the present invention can provide a zoom lens having a zoom ratio of about 40 times which can cover from a super wide-angle area to a super telephoto area with angles of view of not less than 67 degrees at a wide-angle end and not more than 1.6 degrees at a telephoto end, while favorably correcting various aberrations, and further which is excellent in mass productivity, and in particular to a zoom lens preferable for a video camera for people's livelihood, and an imaging apparatus using the zoom lens.

The shapes of the respective parts and numeric values shown in the above-described respective embodiments show only examples for the embodiments when carrying out the present invention, and the technical scope of the present invention should not be restrictively construed by these.

INDUSTRIAL APPLICABILITY

The zoom lens according to the present invention covers from super wide angle to super telephoto while favorably correcting various aberrations and further, it is excellent in mass productivity, and in particular, it is preferably used as a zoom lens for a video camera for people's livelihood and used for the video camera.

The invention claimed is:

1. A zoom lens of an inner focus type having four or five lens groups, including at least a first lens group having positive refractive power, a second lens group having negative refractive power, which is movable in an optical axis direction mainly for zooming (varying power), a third lens group having positive refractive power, and a fourth lens group having positive or negative refractive power, which is, movable, in the optical axis direction for correcting fluctuations in focal position during zooming and for focusing, which lens groups are arrayed in order from an object side, characterized in that:
   said first lens group comprises at least a concave lens, a convex lens, and a triple-cemented lens in which a lens made of special low-dispersion glass is sandwiched in the middle, which lenses are arrayed in order from the object side.

2. The zoom lens as described in claim 1, characterized in that:
   said triple-cemented lens in said first lens group includes a first concave lens A1, a convex lens A2 formed of special low-dispersion glass and a second concave lens A3, which lenses are arrayed in order from the object side, and said first concave lens A1 and said convex lens A2 are formed of materials satisfying the following two conditional formulae (1) and (2):

$$n1-n2>0.3 \tag{1}$$

$$|v1-v2|>40 \tag{2}$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), and vx is an Abbe number vd=(nd−1)/(nF−nC) at the line d of the lens Ax.

3. The zoom lens as described in claim 1, characterized in that:

said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \quad (3)$$

$$v23>80 \quad (4)$$

$$\Delta P23>0.03 \quad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

4. The zoom lens as described in claim 2, characterized in that:

said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \quad (3)$$

$$v23>80 \quad (4)$$

$$\Delta P23>0.03 \quad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

5. The zoom lens as described in claim 1, characterized in that:

said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

6. The zoom lens as described in claim 2, characterized in that:

said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

7. The zoom lens as described in claim 3, characterized in that:

said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

8. The zoom lens as described in claim 4, characterized in that:

said first lens group comprises a first lens of a concave meniscus lens whose convex surface faces the object side, a second lens of a convex lens, a triple-cemented lens made of a third lens of a concave meniscus lens whose convex surface faced the object side, a fourth lens of a convex lens and a fifth lens of a concave meniscus lens whose concave surface faces the object side, and a sixth lens of a convex lens, which lenses are arrayed in order from the object side.

9. A zoom lens of an inner focus type including a first lens group having positive refractive power, a second lens group having negative refractive power, which is movable in an optical axis direction mainly for zooming (varying power), a third lens group having positive refractive power, a fourth lens group having negative refractive power, which is movable in the optical axis direction for correcting fluctuations in focal position during zooming and for focusing, and a fifth lens group having positive refractive power, which lens groups are arrayed in order from an object side, characterized in that:

said first lens group comprises a concave lens, a convex lens, and a triple-cemented lens in which a lens made of special low-dispersion glass is sandwiched in the middle, which lenses are arrayed in order from the object side.

10. The zoom lens as described in claim 9, characterized in that:

said triple-cemented lens in said first lens group includes a first concave lens A1, a convex lens A2 formed of special low-dispersion glass and a second concave lens A3, which lenses are arrayed in order from the object side, and said first concave lens A1 and said convex lens A2 are formed of materials satisfying the following two conditional formulae (1) and (2):

$$n1-n2>0.3 \quad (1)$$

$$|v1-v2|>40 \quad (2)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), and vx is an Abbe number vd=(nd−1)/(nF−nC) at the line d of the lens Ax.

11. The zoom lens as described in claim 9, characterized in that:

said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \quad (3)$$

$$v23>80 \quad (4)$$

$$\Delta P23>0.03 \quad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

12. The zoom lens as described in claim 10, characterized in that:
said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \quad (3)$$

$$v23>80 \quad (4)$$

$$\Delta P23>0.03 \quad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

13. The zoom lens as described in claim 9, characterized in that:
said first lens group comprises a first lens of a concave meniscus lens whose convex surface faces the object side, a second lens of a convex lens, a third lens of a concave meniscus lens whose convex surface faces the object side, a fourth lens L4 of a convex lens, a triple-cemented lens made of a fifth lens of a concave meniscus lens whose convex surface faces the object side, a sixth lens of a convex lens and a seventh lens of a concave meniscus lens whose concave surface faces the object side, and a sixth lens of a convex lens, which lenses are arrayed in order from the object side.

14. The zoom lens as described in claim 10, characterized in that:
said first lens group comprises a first lens of a concave meniscus lens whose convex surface faces the object side, a second lens of a convex lens, a third lens of a concave meniscus lens whose convex surface faces the object side, a fourth lens L4 of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

15. The zoom lens as described in claim 11, characterized in that:
said first lens group comprises a first lens of a concave meniscus lens whose convex surface faces the object side, a second lens of a convex lens, a third lens of a concave meniscus lens whose convex surface faces the object side, a fourth lens L4 of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

16. The zoom lens as described in claim 12, characterized in that:
said first lens group comprises a first lens of a concave meniscus lens whose convex surface faces the object side, a second lens of a convex lens, a third lens of a concave meniscus lens whose convex surface faces the object side, a fourth lens L4 of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

17. The zoom lens as described in claim 9, characterized in that:
said first lens group comprises a first lens of a concave meniscus lens whose convex surface faces the object side, a second lens of a convex lens, a cemented lens made of a third lens L3 of a concave meniscus lens whose convex surface fades the object side and a fourth lens of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

18. The zoom lens as described in claim 10, characterized in that:
said first lens group comprises a first lens of a concave meniscus lens whose convex surface faces the object side, a second lens of a convex lens, a cemented lens made of a third lens L3 of a concave meniscus lens whose convex surface faces the object side and a fourth lens of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

19. The zoom lens as described in claim 11, characterized in that:
said first lens group comprises a first lens of a concave meniscus lens whose convex surface faces the object side, a second lens of a convex lens, a cemented lens made of a third lens L3 of a concave meniscus lens whose convex surface faces the object side and a fourth lens of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

20. The zoom lens as described in claim 12, characterized in that:

said first lens group comprises a first lens of a concave meniscus lens whose convex surface faces the object side, a second lens of a convex lens, a cemented lens made of a third lens L3 of a concave meniscus lens whose convex surface faces the object side and a fourth lens of a convex lens, a triple-cemented lens made of a fifth lens of a concave meniscus lens whose convex surface faces the object side, a sixth lens of a convex lens and a seventh lens of a concave meniscus lens whose concave surface faces the object side, and an eighth lens of a convex lens, which lenses are arrayed in order from the object side.

21. An imaging apparatus having a zoom lens, imaging means for transforming an image taken in by said zoom lens to an electrical image signal, and image control means, characterized in that:

said image control means, referring to a transformation coordinate coefficient provided in advance according to a variable power rate by said zoom lens, moves points on the image which are defined by the image signal formed by said imaging means to form a new image signal subjected to coordinate transformation and to output said new image signal, said zoom lens of an inner focus type having four or five lens groups, comprises at least a first lens group having positive refractive power, a second lens group having negative refractive power, which is movable in an optical axis direction mainly for zooming (varying power), a third lens group having positive refractive power, and a fourth lens group having positive or negative refractive power, which is movable in the optical axis direction for correcting fluctuations in focal position during zooming and for focusing, which lens groups are arrayed in order from an object side, and said first lens group comprises at least a concave lens, a convex lens, and a triple-cemented lens in which a lens made of special low-dispersion glass is sandwiched in the middle, which lenses are arrayed in order from the object.

22. The imaging apparatus as described in claim 21, characterized in that:

said triple-cemented lens in said first lens group includes a first concave lens A1, a convex lens A2 formed of special low-dispersion glass and a second concave lens A3, which lenses are arrayed in order from the object side, and said first concave lens A1 and said convex lens A2 are formed of materials satisfying the following two conditional formulae (1) and (2):

$$n1-n2>0.3 \qquad (1)$$

$$|v1-v2|>40 \qquad (2)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), and vx is an Abbe number vd=(nd−1)/(nF−nC) at the line d of the lens Ax.

23. The imaging apparatus as described in claim 21, characterized in that:

said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \qquad (3)$$

$$v23>80 \qquad (4)$$

$$\Delta P23>0.03 \qquad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

24. The imaging apparatus as described in claim 22, characterized in that:

said triple-cemented lens in said first lens group includes a first concave lens A1, a convex lens A2 formed of special low-dispersion glass and a second concave lens A3, which lenses are arrayed in order from the object side, and said convex lens A2 and said second concave lens A3 are formed of materials satisfying the following three conditional formulae (3), (4), and (5):

$$|n2-n3|<0.1 \qquad (3)$$

$$v23>80 \qquad (4)$$

$$\Delta P23>0.03 \qquad (5)$$

wherein refractive indexes at a line C, a line d, a line F and a line g are nC, nd, nF and ng, respectively, and nx is a refractive index nd at the line d of a lens Ax (an xth lens from the object side among the triple-cemented lens, hereinafter, this is the same), vx is an Abbe number vd=(nd−1)/(nF−nC) at the line d of the lens Ax, and Px is a partial dispersion ratio P=(ng−nF)/(nF−nC) of the lens Ax.

25. The imaging apparatus as described in claim 21, characterized in that:

said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

26. The imaging apparatus as described in claim 22, characterized in that:

said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

27. The imaging apparatus as described in claim 23, characterized in that:
said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

28. The imaging apparatus as described in claim 24, characterized in that:
said first lens group comprises a first lens of a concave meniscus lens whose convex surface faces the object side, a second lens of a convex lens, a triple-cemented lens made of a third lens of a concave meniscus lens whose convex surface faces the object side, a fourth lens of a convex lens and a fifth lens of a concave meniscus lens whose concave surface faces the object side, and a sixth lens of a convex lens, which lenses are arrayed in order from the object side.

* * * * *